(12) United States Patent
March et al.

(10) Patent No.: US 7,868,769 B2
(45) Date of Patent: Jan. 11, 2011

(54) METHOD AND APPARATUS FOR DETERMINING ANIMAL RELATIONSHIPS

(75) Inventors: Paul Andrew March, New South Wales (AU); Robert Keith Ingram, Victoria (AU)

(73) Assignee: Farmtek Pty Ltd., Chatswood, NSW (AU)

(*) Notice: Subject to any disclaimer, the term of this patent is extended or adjusted under 35 U.S.C. 154(b) by 386 days.

(21) Appl. No.: 11/908,469

(22) PCT Filed: Mar. 17, 2006

(86) PCT No.: PCT/AU2006/000358

§ 371 (c)(1),
(2), (4) Date: Apr. 10, 2008

(87) PCT Pub. No.: WO2006/096932

PCT Pub. Date: Sep. 21, 2006

(65) Prior Publication Data

US 2008/0218357 A1    Sep. 11, 2008

(30) Foreign Application Priority Data

Mar. 17, 2005    (AU) .............................. 2005901309

(51) Int. Cl.
*G08B 23/00*    (2006.01)

(52) U.S. Cl. ................................................. 340/573.1
(58) Field of Classification Search ............. 340/573.1, 340/870.11, 572.1, 539.21, 539.23, 686.6, 340/689
See application file for complete search history.

(56) References Cited

U.S. PATENT DOCUMENTS

| 4,247,758 A | * | 1/1981 | Rodrian ........................ 377/6 |
| 4,503,808 A | * | 3/1985 | McAlister .................... 600/551 |
| 5,881,673 A | * | 3/1999 | Beach et al. ................. 119/174 |
| 2007/0069890 A1 | * | 3/2007 | Tuck ...................... 340/539.13 |

FOREIGN PATENT DOCUMENTS

| GB | 2 260 196 A | 4/1993 |
| NZ | 507129 A | 8/2002 |
| WO | 02/34038 A1 | 5/2002 |
| WO | 03/061373 A2 | 7/2003 |

* cited by examiner

*Primary Examiner*—Phung Nguyen
(74) *Attorney, Agent, or Firm*—Sughrue Mion, PLLC

(57) ABSTRACT

A system and method of determining a relationship between a first animal (100) and a second animal (110). The system includes a detection means (130) for detecting if the first animal (100) is within a defined proximity (120) of the second animal (110). The system also includes a means to determine, in response to at least one detection, the relationship between the first animal (100) and the second animal (110).

29 Claims, 15 Drawing Sheets

400 — Detect first animal within a proximity of the second animal

410 — Determine a relationship between the first animal and second animal

FIG. 4A

METHOD AND APPARATUS FOR DETERMINING ANIMAL RELATIONSHIPS

TECHNICAL FIELD

The present invention generally relates to determining animal relationships.

BACKGROUND ART

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

In livestock industries, it is difficult to accurately identify a respective dam and sire for an offspring cost effectively. Furthermore, it is extremely difficult to accurately determine the number of litter from a particular relationship cost effectively and/or accurately.

One method is to use different coloured "raddles" to identify the sire that mounted a dam. However this method only identifies the first sire that mounted the dam. If the first dam does not successfully conceive in the first oestrus, then a subsequent successful sire may not be determined.

An alternative method is to use a single sire to mate with a group of selected dams. However, this method severely limits the use of sires and also suffers from financial implications in terms of capital investment in infrastructure required to configure paddocks to suit the sire versus dam ratio.

A further method includes using DNA technology to determine the sire and dam for a respective offspring. However, the cost of testing animals on an ongoing basis is somewhat prohibitive, wherein each test can cost approximately at least $20 (AUS) depending on the accuracy required. Furthermore, tagging of the animals is still required in this situation for identification, adding further cost and labour to this method.

One manual method for determining a relationship between a dam and an offspring is to bring dams and offspring into small pens or areas, and have an individual watch the dams and offspring over a period of time to see which progeny stays with which dam. There are several variations to this method, though the basic activity remains consistent. When the offspring approaches a likely mother, the two animals are gathered and recorded. However, this manual method is time, labour and capital intensive. Furthermore, this method only results in determining the dam, which may not conclusively result in determining the all the offspring in the litter in all situations. This method also suffers from high levels of handling of animals, which can lead to high error rates in determining mothers to progeny. Additionally, this method also suffers from accurately determining twin progenies, as a first twin may take to the mother relatively quickly compared to a second twin.

This identifies a need for an accurate and cost effective method and apparatus which seeks to address, or at least ameliorate problems inherent to the above-disclosed methods and systems.

DISCLOSURE OF INVENTION

In a first broad form, the present invention provides a method of determining a relationship between a first animal and a second animal, wherein the method includes:

detecting if the first animal is within a defined proximity of the second animal; and in response to at least one detection, determining the relationship between the first animal and the second animal.

In particular, but non-limiting forms, the defined proximity includes at least one of:

a spatial proximity at a point in time; and, a temporal proximity at a location.

In other particular, but non-limiting forms, the first animal is associated with a first communication unit and the second animal is associated with a second communication unit, wherein the method includes:

detecting if the first communication unit is within the defined proximity of the second communication unit.

Optionally, the method includes:

recording, in a detection system, data indicative of the first communication unit being within the defined proximity of the second communication unit; and analysing the data to determine if a relationship exists between the first animal and the second animal.

Also optionally, the method includes determining, in response to at least one detection, at least one of:

a genetic relationship between the first animal and second animal;

a sexual relationship between the first animal and second animal; and a social relationship between the first animal and second animal.

In some embodiments, the method includes analysing the data which is indicative of communication performed by the first communication unit and the second communication.

In particular, but non-limiting forms, the data is indicative of a first communication unit identity of the first communication unit and a second communication unit identity of the second communication unit, wherein the method includes:

determining, using the data, a first identity associated with the first animal and a second identity associated with the second animal; and using the first identity and second identity to determine the relationship between the first animal and the second animal.

In optional embodiments, the data is indicative of a tilt of at least one of the first communication unit and the second communication unit, wherein the method includes using the data to determine a sexual relationship between the first animal and second animal.

In another broad form, the present invention provides a system for determining a relationship between a first animal and a second animal, wherein the system is configured to:

detection system to detect if the first animal is within a defined proximity of the second animal; and a means to determine, in response to at least one detection, the relationship between the first animal and the second animal.

In particular, but non-limiting forms, the proximity includes at least one of:

a spatial proximity at a point in time; and, a temporal proximity at a location.

In other forms, the detection system includes a first communication unit associated with the first animal and a second communication unit associated with the second animal, wherein the detection system is configured to detect if the first communication unit is within the defined proximity of the second communication unit.

According to one aspect, the detection system records data indicative of the first communication unit being within the defined proximity of the second communication unit.

According to another aspect, the system analyses the data recorded by the detection system to determine if a relationship exists between the first animal and the second animal.

Optionally, the system includes a processing system to analyse the data recorded by the detection system to allow a relationship between the first animal and second animal to be determined.

In one embodiment, the processing system is configured to analyse the data which is indicative of communication performed by the first communication unit and the second communication.

In another embodiment, the system is configured to determine, in response to at least one detection, at least one of:

a genetic relationship between the first animal and second animal;

a sexual relationship between the first animal and second animal; and a social relationship between the first animal and second animal.

In other embodiments, the first communication unit includes a first communication unit identity, and the second communication unit includes a second communication unit identity, and wherein the data recorded by the detection system is indicative of the first communication unit identity and the second communication unit identity.

In other aspects, at least one of the first communication unit and second communication unit include a tilt sensor, wherein the data recorded by the detection system is indicative of a tilting event.

In one particular, but non-limiting embodiment, the system is configured to use the data indicative of the tilting event for determining a sexual relationship between the first animal and the second animal.

In another particular, but non-limiting embodiment, the first communication unit and second communication unit communicate using a wireless communication medium.

In one aspect, the detection system includes a recording system to record at least one detection of the first animal within the defined proximity of the second animal.

In one aspect, the recording system is portable.

In an alternative aspect, the recording system is located at a fixed position.

In some embodiments, the recording system is configured to communicate with at least one of the first communication system and the second communication system to record the at least one detection of the first animal within the defined proximity of the second animal.

Optionally, the data is indicative of a direction and/or orientation of the first animal relative to the second animal, wherein the system is configured for determining, using the data indicative of the direction and/or orientation, at least one of:

a social relationship between the first animal and second animal;

a sexual relationship between the first animal and second animal; and a genetic relationship between the first animal and second animal.

The first communication unit may be least one of:
a transmitter unit;
a receiver unit; and
a transceiver unit.

The second communication unit may be least one of:
a transmitter unit;
a receiver unit; and
a transceiver unit.

In another broad form the present invention provides a system for determining a relationship between a first animal and a second animal, wherein the system includes:

a means to measure if the first animal is within a defined proximity of the second animal; and a means to determine, in response to at least one measurement, the relationship between the first animal and the second animal.

According to another broad form the present invention provides a method for determining a relationship between a first animal and a second animal, wherein the method includes, in a processing system:

receiving, from a detection system, data indicative of a first animal being located within a relative proximity of the second animal; and, determining, using the received data, a relationship between the first animal and the second animal.

According to another broad form, the present invention provides a system for determining a relationship between a first animal and a second animal, wherein the system includes a processing system configured to:

receive, from a detection system, data indicative of a first animal being located within a relative proximity of the second animal; and, determine, using the received data, a relationship between the first animal and the second animal.

According to another broad form, the present invention provides a method for determining a relationship between a first animal and a second animal, the first animal having a first communication unit attached thereto, and the second animal having a second communication unit attached thereto, wherein the method includes, in a processing system:

receiving, from the first communication unit, data indicative of a number of transmissions between the first communication unit and the second communication unit during a period of time, each transmission being indicative of the first communication unit being located within a relative proximity of the second communication unit; and, determining, using the received data, a relationship between the first animal and the second animal.

Optionally, the method includes determining a genetic relationship between the first animal and the second animal.

Optionally, the method includes determining a sexual relationship between the first animal and the second animal.

Preferably, the first communication unit may be a transmitter.

Optionally, the first communication unit may be an active RFID tag.

Optionally, the first communication unit may be a passive RFID tag.

Optionally, the second communication unit may be a transceiver capable of receiving data from the first communication unit and capable of transferring data to the processing system.

Optionally, the method includes receiving, from the transceiver, data indicative of the number of transmissions, wherein each transmission is further indicative of at least one of:

an identity of the transceiver;
an identity of the transmitter;
a time when the transceiver was located within the relative proximity of the transceiver; and,
an indication of whether the transceiver was tilted beyond a threshold angle when a transmission was received by the transceiver from the transmitter.

Optionally, the method includes determining a genetic relationship between a dam and an offspring.

Optionally, the method includes determining a sexual relationship between a sire and a dam.

Optionally, the method includes determining a relationship between the first animal and second animal, wherein the first animal and second animal includes at least one of:
- cattle;
- sheep;
- goats;
- pigs;
- deer;
- native and wild animals;
- fish;
- birds;
- grazing animals;
- alpacas; and,
- any species of livestock and domesticated animals.

Optionally, the method includes generating, using the received data, genetic data for the offspring being indicative of at least one of:
- a date of birth for the offspring;
- a mother of the offspring;
- a birth type related to the offspring;
- a measurement of at least one offspring trait;
- a measurement of at least one dam trait; and,
- a comparable measurement to the offspring's related siblings.

Optionally, the method includes generating the genetic data for the offspring which is further indicative of a sire of the offspring.

Optionally, the method includes generating, using the genetic data for the offspring, an Estimated Breeding Value for the respective offspring.

Optionally, the method includes generating, using the received data, breeding data related to the dam, wherein the breeding data related to the dam is indicative of:
- the fertility and/or fecundity of the dam;
- the fertility and/or fecundity of the sire;
- a number of offspring the dam has given birth to; and
- whether the dam can successfully raise multiple offspring.

Optionally, the method includes generating, using the received data, breeding data related to the sire, wherein the breeding data related to the sire is indicative of:
- the fertility/fecundity of the sire;
- timing of mating;
- expected date of birth
- correct dam mated by sire;
- various Estimated Breeding Values for dams and sires.

According to another broad form, the present invention provides a system for determining a relationship between a first animal and a second animal, the first animal having a first communication unit attached thereto, and the second animal having a second communication unit attached thereto, wherein the system includes a processing system configured to:
- receive, from the first communication unit, data indicative of a number of transmissions between the first communication unit and the second communication unit during a period of time, each transmission being indicative of the first communication unit being located within a relative proximity of the second communication unit;
- determine, using the received data, a relationship between the first animal and the second animal.

According to another broad form, the present invention provides a reading device for allowing an operator to read data from a communication unit, the data being used for determining a relationship between a first animal and a second animal, the first animal having a first communication unit attached thereto, and the second animal having a second communication unit attached thereto, wherein the method includes, in a reading device:
- receiving data from a second communication unit, the data being indicative of a number of transmissions between the first communication unit and the second communication unit during a period of time, each transmission being indicative of the first communication unit being located within a relative proximity of the second communication unit;
- storing the received data in a second communication unit data store; and, transferring the stored data to a processing system, wherein the processing system determines, using the data, a relationship between the first animal and the second animal Optionally, the method includes, in a reading device, generating a read signal, the second communication unit being responsive to the read signal to transfer, to the reading device, the data.

According to another broad form, the present invention provides a reading device for allowing an operator to read data from a communication unit, the data being used for determining a relationship between a first animal and a second animal, the first animal having a first communication unit attached thereto, and the second animal having a second communication unit attached thereto, wherein the reading device includes:
- a transceiver for at least one of:
  - generating a read signal; and,
  - receiving data from the second communication unit;
- a data store; and,
- a processor for:
  - causing the transceiver to receive data from a second communication unit, the data being indicative of a number of transmissions between the first communication unit and the second communication unit during a period of time, each transmission being indicative of the first communication unit being located within a relative proximity of the second communication unit;
  - storing the received data in the data store; and,
  - transferring the stored data to a processing system, wherein the processing system determines, using the data, a relationship between the first animal and the second animal.

Optionally, the reading device includes the processor being configured to cause the transceiver to generate a read signal, the second communication unit being responsive to the read signal to transfer, to the reading device, the data.

According to another broad form, the present invention provides a method for determining a relationship between a first animal and a second animal, the first animal having a first communication unit attached thereto, and the second animal having a second communication unit attached thereto, wherein the method includes:
- in the first communication unit:
  - attempting to transmit data indicative of an identity of the transmitter; and,
- if the second communication is located within a relative proximity of the first communication unit, the method including:
- in the second communication unit:
  - receiving the data from the first communication unit;
  - transmitting the data to a processing system, wherein the processing system determines, using the received data, a relationship between the first animal and the second animal.

According to another broad form, the present invention provides a system for determining a relationship between a first animal and a second animal, the first animal having a first communication unit attached thereto, and the second animal having a second communication unit attached thereto, wherein the system includes:

the first communication unit for:
attempting to transmit data indicative of an identity of the first communication unit; and,
the second communication unit for:
receiving the data from the first communication unit if the second communication unit is located within a proximity of the first communication unit;
transmitting the data to a processing system, wherein the processing system determines, using the received data, a relationship between the first animal and the second animal.

According to another broad form, the present invention provides a method for determining a relationship between a first animal and a second animal, the first animal having a first communication unit attached thereto, and the second animal having a second communication unit attached thereto, wherein the method includes:

in the first communication unit:
attempting to transmit data indicative of an identity of the transmitter; and,
if the second communication is located within a relative proximity of the first communication unit, the method including:
in the second communication unit:
receiving the data from the first communication unit;
transmitting the data to a reading device operated by an operator, wherein the reading device transfers the data to a processing system for determining, using the received data, a relationship between the first animal and the second animal.

According to another broad form, the present invention provides a system for determining a relationship between a first animal and a second animal, the first animal having a first communication unit attached thereto, and the second animal having a second communication unit attached thereto, wherein the system includes:

the first communication unit for:
attempting to transmit data indicative of an identity of the first communication unit; and,
the second communication unit for:
receiving the data from the first communication unit if the second communication unit is located within a proximity of the first communication unit;
transmitting the data to a reading device operated by an operator, wherein the reading device transfers the data to a processing system for determining, using the received data, a relationship between the first animal and the second animal.

According to another broad form, the present invention provides a method for determining a relationship between a first animal and a second animal, the first animal having a first communication unit attached thereto, and the second animal having a second communication unit attached thereto, wherein the method includes:

in the first communication unit:
attempting to transmit data indicative of an identity of the first communication unit; and,
in the second communication unit:
receiving the data from the first communication unit if the second communication unit is located within a proximity of the first communication unit; and,
transmitting the data to a reading device;
in the reading device:
receiving the data from the second communication unit; and,
transferring the data to a processing system;
in the processing system:
receiving, from the reading device, data indicative of a number of transmissions between the first communication unit and the second communication unit during a period of time, each transmission being indicative of the first communication unit being located within a relative proximity of the second communication unit; and,
determining, using the received data, a relationship between the first animal and the second animal.

According to another broad form, the present invention provides a system for determining a relationship between a first animal and a second animal, the first animal having a first communication unit attached thereto, and the second animal having a second communication unit attached thereto, wherein the system includes:

the first communication unit configured to:
attempt to transmit data indicative of an identity of the first communication unit; and,
the second communication unit configured to:
receive the data from the first communication unit if the second communication unit is located within a proximity of the first communication unit; and,
transmit the data to a reading device;
the reading device configured to:
receive the data from the second communication unit; and,
transfer the data to a processing system; and,
the processing system configured to:
receive, from the first communication unit, data indicative of a number of transmissions between the first communication unit and the second communication unit during a period of time, each transmission being indicative of the first communication unit being located within a relative proximity of the second communication unit; and,
determine, using the received data, a relationship between the first animal and the second animal.

BRIEF DESCRIPTION OF FIGURES

An example embodiment of the present invention should become apparent from the following description, which is given by way of example only, of a preferred but non-limiting embodiment, described in connection with the accompanying figures.

FIG. 4A illustrates a flow diagram of an example method of determining a relationship between a first and a second animal;

MODES FOR CARRYING OUT THE INVENTION

Figure 1:
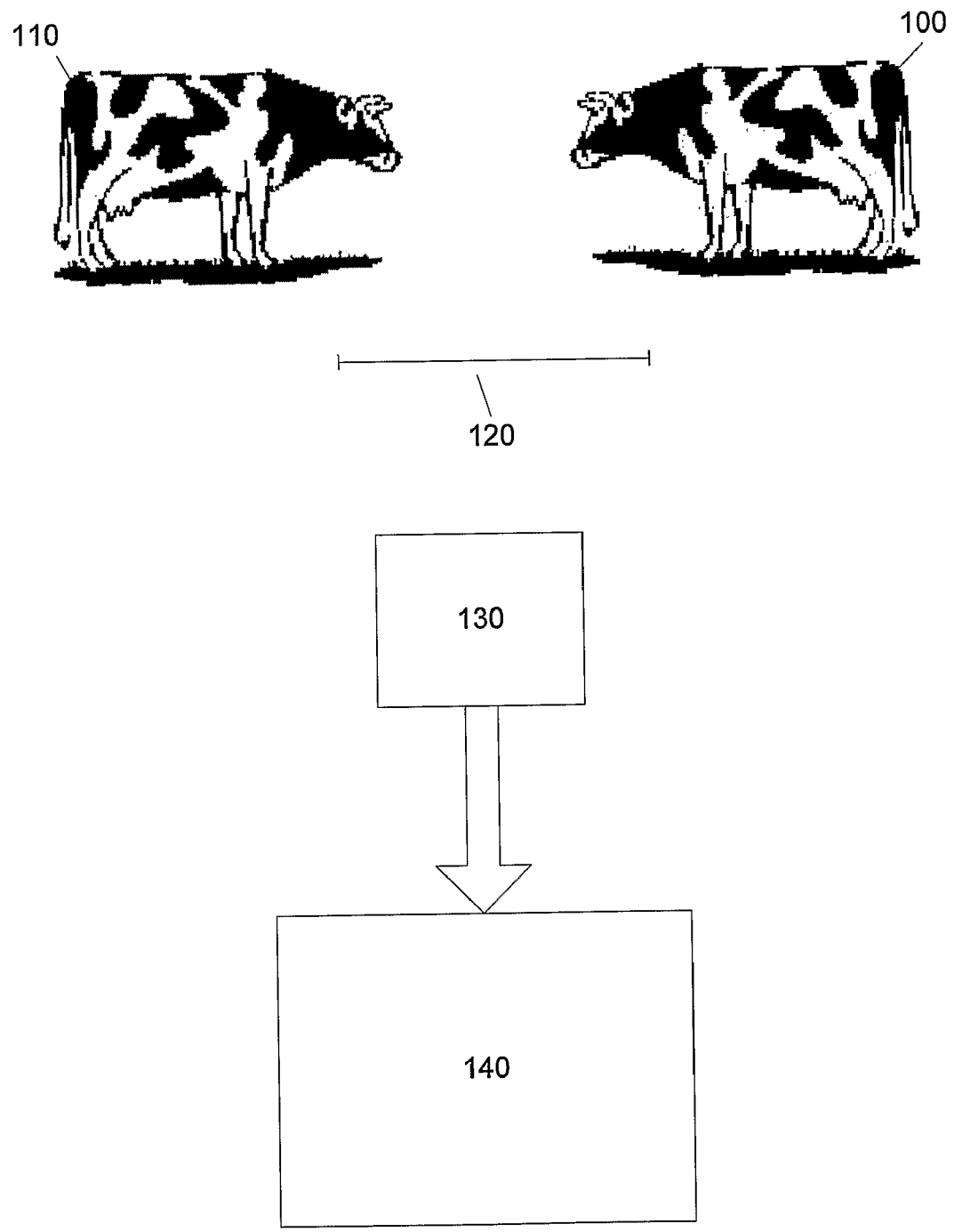
FIG. 1 illustrates an example system for determining a relationship between a first animal and a second animal.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

An example system for determining a relationship between a first animal and a second animal will now be described with reference to FIG. 1.

In particular, the system 1 is configured to detect whether a first animal 100 is within a defined proximity 120 of a second animal 110, and in response to at least one detection, the system 1 determines if a relationship exists between the first 100 and second animal 110. The system 1 generally includes a detection system 130 for detecting whether the first animal 110 is within a defined proximity 120 of the second animal 100.

The detection system 130 can be configured to detect whether the first animal 100 is located within a spatial proximity (ie. located within a particular distance and/or region at a particular point or points in time) of the second animal. Additionally or alternatively, the detection system 130 can be configured to detect whether the first animal 110 is within a temporal proximity (ie. located at a point or region in space within a period of time) of the second animal 110.

The system 1 also generally includes a processing system 140 to perform analysis on the at least one detection. The detection system 130 may transfer data to the processing system 140, as indicated by the block arrow in FIG. 1, for analysis in determining if a relationship exists between animals.

Figure 2:
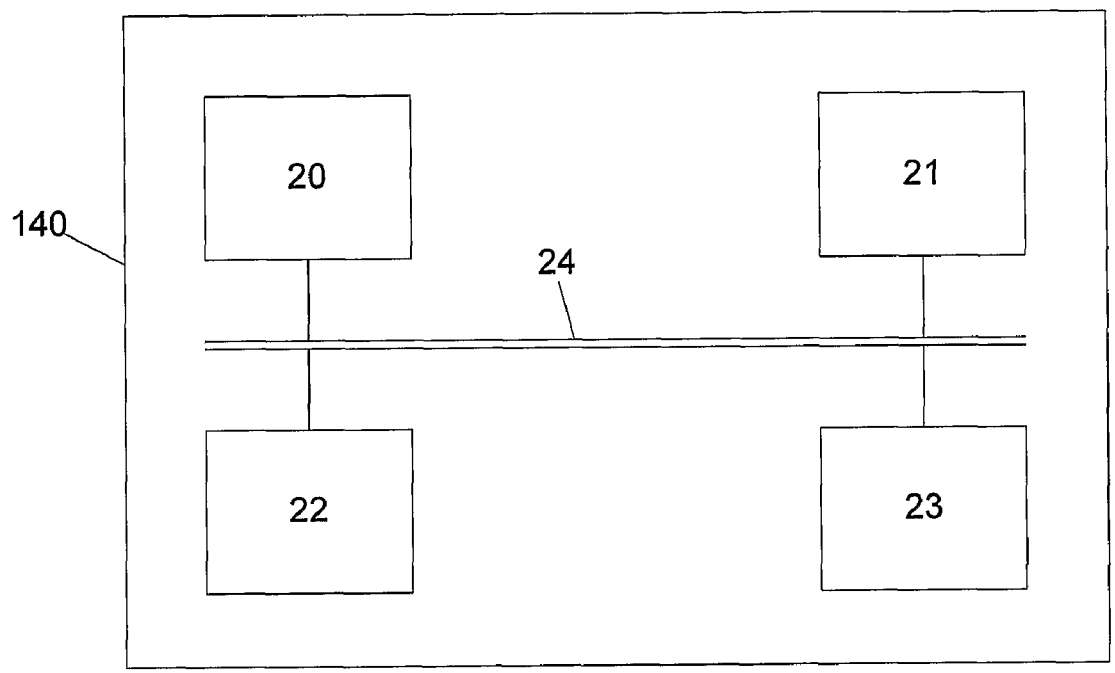
FIG. 2 illustrates an example functional block diagram of a processing system.

An example of a processing system 140 suitable for analysing data to determine animal relationships is shown in FIG. 2. In particular, the processing system 140 generally includes at least a processor 20, a memory 21, and an input device 22, such as a keyboard, an output device 23, such as a display, coupled together via a bus 24 as shown. An optional external interface may be also provided. The processing system 140 is capable of executing computer software.

Accordingly, it will be appreciated that the processing system 140 may be any form of processing system suitably programmed to perform the method, as will be described in more detail below. The processing system 140 may therefore be a suitably programmed computer, laptop, palm computer, network or web server, or the like. Alternatively, specialised hardware or the like may be used.

In any event, it will be appreciated that suitable computer software in the form of computer executable software may be used in order to perform the methods described below.

A more detailed example system for determining a relationship between a first animal and a second animal will now be described with reference to FIG. 3A.

In particular, the detection system 130 includes a first communication unit 310 attached to or associated with the first animal 100, and a second communication unit 320 attached to or associated with the second animal 110. The system 1 also includes a data system 150 which collects data from the detection system 140. The data collected may be directly indicative of a relationship between particular animals. Alternatively, the data collected may be indirectly indicative of a relationship between particular animals, and thus processing may be required to determine if a relationship exists between particular animals.

The data system 150 may include a reading device 300 which collects the data, and a data processing system 140 which performs any required analysis on the data collected to determine any relationship the animals. The reading device 300 includes a processor operably connected by a bus to a data store for recording the collected data. The reading device 300 can optionally be portable (hand-held) to assist collection of the data. The reading device 300 and data processing system 140 may be integral wherein the reading device 300 and can perform processing on the collected data to determine if relationships exist. However, the reading device 300 may be a physically separate unit to the processing system 140, wherein the data is transferred to the processing system 140 for analysis.

In this example, the first communication unit 310 transmits a signal 330 within a defined spatial proximity 120. The signal 330 is preferably transferred using a wireless communication medium. The signal 330 includes data indicative of at least an identity of the first communication unit 310. If the second communication unit 320 is positioned within the defined spatial proximity 120, the second communication unit 320 receives the data and records the received data. It will be appreciated that the second communication unit 320 acts similar to a data-logger, wherein the data is stored in the second communication unit's memory. The recordal of data by the second communication unit 320 is indicative of the first communication unit 310 being positioned within the defined spatial proximity 120 of the second communication unit 320. The recorded data can be indicative of a relationship between two animals 100, 110 and/or can be used to determine if a relationship exists between the animals 100, 110.

In this example, the spatial proximity 120 is generally defined by the strength of the signal 330 transmitted by the first communication unit 310 and/or the strength of the signal 330 received by the second communication unit 320.

The data recorded in the second communication unit 320 is then collected by the data system 150. The data may be recorded by the reading device 300 and later transferred 360 to the data processing system 140. Alternatively, the data can be directly provided to the data processing system 140. The data recorded may by collected by the data system 150 using a physical or wireless communication medium.

In this example, the first communication unit 310 generally includes a processor operably connected to a transmitter and a unique identity. The second communication unit 320 generally includes a processor operably connected to a receiver, a data store, and a unique identity.

Another example system for determining a relationship between a first animal and a second animal will now be described with reference to FIG. 3B.

In particular, the detection system 130 includes a first communication unit 370 and a second communication unit 380 which only transmit data, and a fixed reading device 300 for receiving the transmitted data. The first communication unit 370 is attached or associated with the first animal 100 and the second communication unit 380 is attached or associated with the second animal 110. The first and second communication units 370, 380 perform similar functionality, however, each communication unit includes a unique identity. The data transmitted is indicative of the identity of the respective communication unit. The reading device 300 of the detection system 130 is located in a fixed location in an area within which the animal grazes, such as a water trough, and receives signals 375, 385 from the first 370 or second communication unit 385 if the first communication unit 370 or second communication unit 380 are positioned within a defined region 390 of the reading device 300.

Figure 3A:
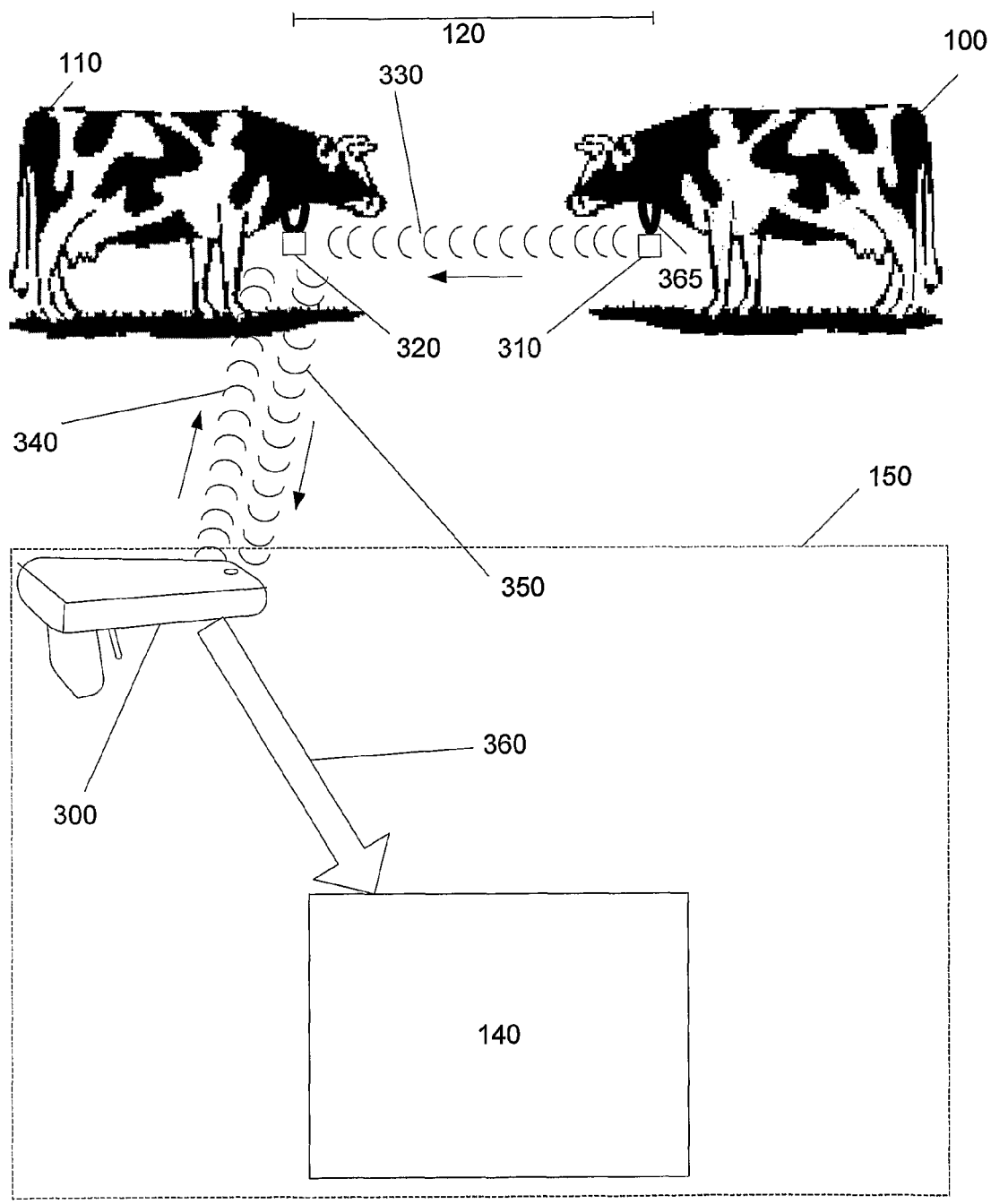
FIG. 3A illustrates an example system including a first and second communication unit and a reading device for determining a relationship between a first animal and a second animal.
Figure 3B:
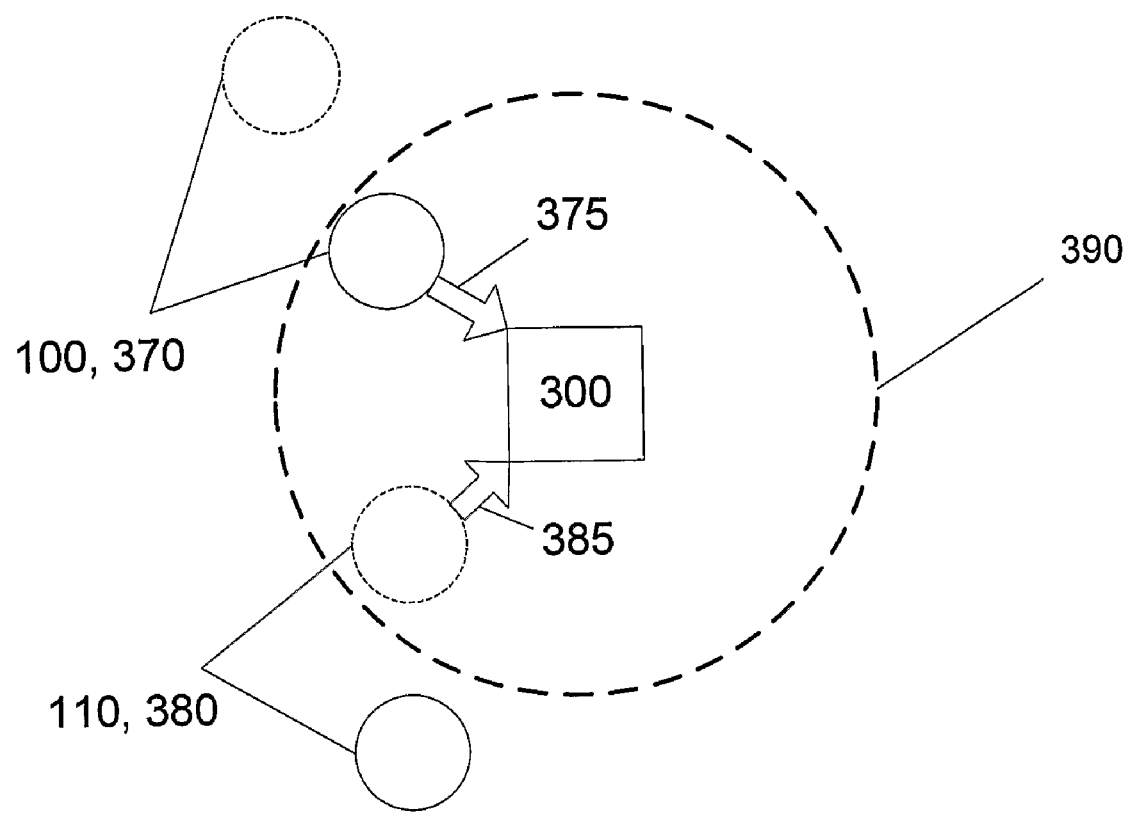
FIG. 3B illustrates another example system using a first and second communication unit and a fixed reading device for determining a relationship between a first animal and a second animal.

As can be seen in FIG. 3B, the full lines of the first 100 and second animals 110 graphically represent a position of the animals 100, 110 at a first point in time, and the dotted lines of the first 100 and second animals 110 graphically represent a position of the animals 100, 110 at a second point in time. The dotted line surrounding the reading device 300 graphically represents the defined region 390.

The data recorded by the detection system 130 may then be analysed, wherein the recorded data is used to determine whether the first 100 and second animals 110 were detected within a temporal proximity 120 of each other within the defined region 390 of the reading device 300.

In this example, the first communication unit 370 and second communication unit 380 generally include a processor operably connected to a transmitter and a unique identity.

The detection system 130 can include communication units which communicate using simplex, half-duplex, or fully duplex communication. Furthermore, it will be appreciated that the detection system 130 may include a combination of units which act as receivers, transmitters, or transceivers. The various combinations of communication units of the detection system 130 is explained in further detail later in this document.

The system 1 may be used for determining, for example, at least one of:
a genetic relationship between a dam, a sire, and an offspring;
a sexual relationship between a sire and a dam; and
a social relationship between particular animals.

By detecting a number of events when an animal 100 is within a particular proximity of another animal 110, the system 1 provides an accurate indication of the relationship between the respective animals 100, 110. By detecting events when the first animal 100 and second animal 110 are within a defined proximity 120, the detected events can be recorded and analysed to accurately determine a relationship between the first animal 100 and second animal 110.

These example systems require minimal manual intervention such as manually watching animals in the paddock over a period of time or excessive handling of animals. As the detection system 130 detects and records events when the first animal 100 is within the defined proximity 120 of the second animal 110, substantial manual operation and associated costs are alleviated. Furthermore, the accuracy of the determining if a relationship exists is substantially increased.

An example method for determining a relationship between a first animal and a second animal will now be described with reference to FIG. 4A.

In particular, at step 400, the method includes detecting that a first animal 110 is within a defined proximity 120 of a second animal 100. At step 410, in response to at least one detection of the first animal 100 being within the defined proximity of the second animal 110, the method includes determining, using the at least one detection, if a relationship exists between the first animal 100 and the second animal 110.

Figure 4B:
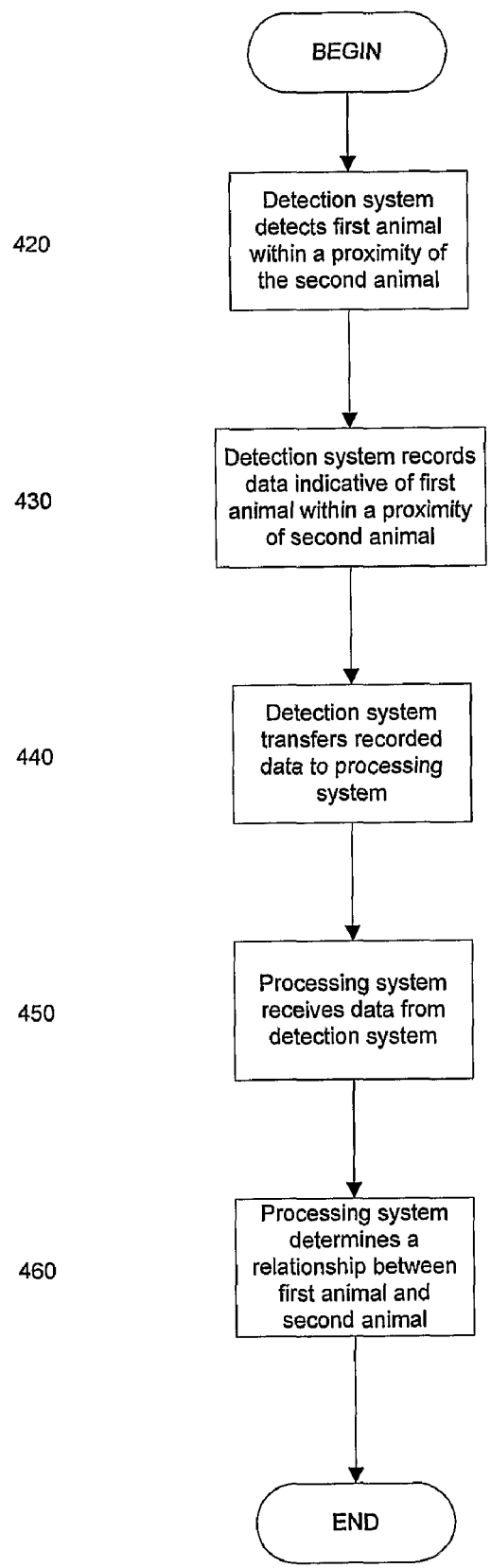
FIG. 4B illustrates another flow diagram of an example of a method of determining a relationship between a first and second animal.

A further example method of determining a relationship between a first animal and a second animal will now be described with reference to FIG. 4B.

In particular, at step 420, the detection system 130 detects the first animal 100 within a proximity 120 of the second animal 110. At step 430, the detection system 130 records data indicative of the first animal 100 being within the proximity 120 of the second animal 110. At step 440 and 450, the detection system 130 transfers the data to the processing system 140. At step 460, the processing system 140 determines a relationship between the first animal 100 and second animal 110.

Figure 5A:
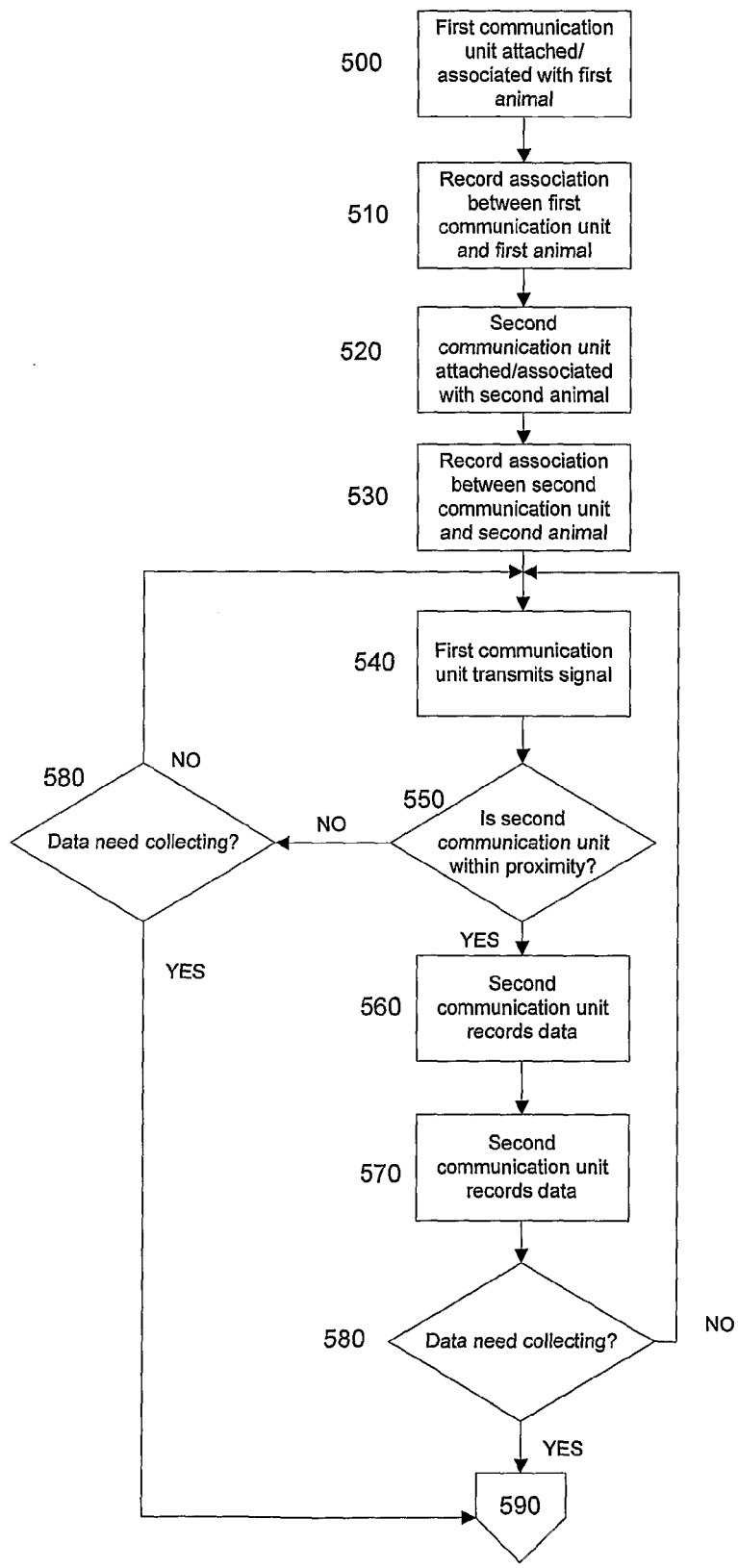
FIGS. 5A and 5B illustrate another example flow diagram of a method of determining a relationship between a first and second animal based on spatial proximity.
Figure 5B:
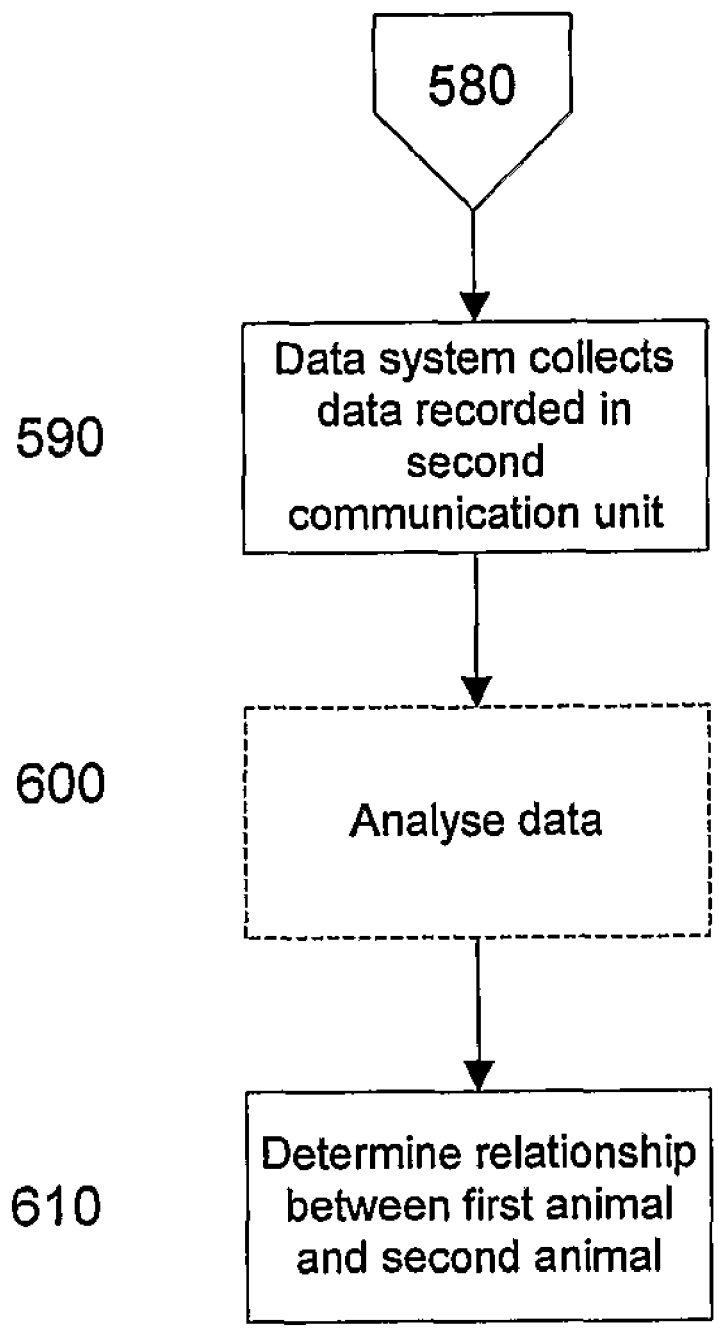

A more detailed example of determining a relationship between a first animal 100 and a second animal 110 will now be described with reference to FIGS. 5A and 5B. The method described with reference to FIGS. 5A and 5B makes reference to the example system described in FIG. 3A.

At step 500, a first communication unit 310 is attached or associated with a first animal 100. Generally, relationships are determined for a plurality of animals. Therefore, for example, the female animals in the plurality of animals may be provided with first communication units 100. Also, a second communication unit 320 is attached or associated with a second animal 110. In regard to the plurality of animals, the remaining portion of animals, for example, may be provided with second communication units 320, for example the males in the plurality of animals.

At step 510, the data system 150 (such as the reading device) records an association between the identity of the first communication unit 310 and the first animal 100. Generally, animals have some form of identity, such as a branding or visual tag. The identity of each animal can then be recorded with the identity of the communication unit attached or associated therewith. It will be appreciated that other identities of the animal can be used to associate the animal with the communication unit, as will be discussed in more detail.

At step 520, the data system 150 records an association between the identity of the second communication 320 and the second animal 110. This step can be performed similarly to step 510.

At step 530, the animals 100, 110 are released to freely graze.

At step 540, the first communication unit 310 attached or associated with the first animal 100 attempts to transmit a signal to the second communication unit 320 attached or associated with the second animal 110. In this particular example, the signal represents data which is at least indicative of the identity of the first communication unit 310.

At steps 550 and 560, if the second communication unit 320 is located within the defined proximity 120 of the first communication unit 310, the second communication unit 320 receives the signal 330 and records the data which is at least indicative of the identity of the first communication unit 310 in the second communication unit's 320 memory. The data recorded by the second communication unit 320 may also be indicative of other measurements, as will be discussed in more detail.

At step 570 and 580, the data recorded in at least some of the second communication units 320 are collected by the data system 150 after a period of time. The data collected by the data system 150 is at least indicative of the identity of the first communication units 310 which were recorded within the defined proximity 120 of the second communication unit 320, and the identity of the respective second communication unit 320 which the data is being collected from. As previously stated, the data may also be indicative of other measurements.

Optionally, at step 590, if the data collected is not directly indicative of whether a relationship exists between particular animals, the data processing system 140 performs an analysis of the data collected to determine whether a relationship exists between particular animals 100, 110. This can include performing a statistical analysis of the data collected.

This analysis may include a probabilistic approach, wherein the data may be analysed to indicate a frequency of events when a particular communication unit was located within the defined proximity. For example, the analysis may include generating a table as shown below:

TABLE 1

Distribution of events per identity for second communication unit ID 1000

| IDENTITY | NUMBER OF EVENTS |
|---|---|
| 1003 | 567 |
| 1005 | 20 |
| 1007 | 2 |

As shown in Table 1, the data generated indicates the frequency of recorded events when each first communication unit was positioned within the defined proximity of the second communication unit having an identity of 1000. The frequency of events are indicative of recordings over a period of time. As can be seen from Table 1, the first communication unit having identity 1003 was located 567 times within the defined proximity relative to the second communication unit having identity 1000. Furthermore, first communication unit having identity 1005 was located within the defined proximity 20 times, and the first communication unit having an identity of 1007 was located 2 times within the defined proximity.

Alternatively, the table generated may include an amount of time that each first communication unit 310 was located within the defined proximity 120 of the second communication unit 320.

By analysing the results of the generated table, a percentage of total events (or total time if appropriate) indicative of the first communication units 310 being detected within the defined proximity 120 can be determined. This is shown by example in Table 2 below.

TABLE 2

Percentage of total events per identity for second communication unit ID 1000

| IDENTITY | PERCENTAGE OF TOTAL EVENTS (or time) |
|---|---|
| 1003 | 96.3% |
| 1005 | 3.4% |
| 1007 | 0.3% |

At step 600, the method includes determining if a relationship exists between any of the animals. As can be seen from Table 2, the first communication unit having identity 1003 has a 96.3% percentage of total events compared to 3.4% and 0.3% for the remaining two first communication units respectively. Using a probabilistic approach, it is determined that a relationship exists between the animal associated with the second communication unit 320 having the identity 1000 and the animal associated with the first communication unit 310 having the identity 1003.

If the first communication units 310 were associated with cows and the second communication units 320 were associated with bulls, step 600 would allow determination of a sexual relationship between the cow association with the first communication unit 310 having identity 1000, and the bull associated with the second communication unit 320 having identity 1003. If an offspring eventuates from the relationship, the cow can be determined to be the dam and the bull can be determined to be the sire in the relationship.

If the first communication units 310 were associated with cows and the second communication units 320 were associated with calves, step 600 would allow the determination of a genetic relationship between the cow associated with the first communication unit 310 having identity 1000, and the calve associated with the second communication unit 320 having identity 1003. This process is generally referred to as "mothering up".

If after performing an analysis of the collected data, the total percentages were split relatively evenly between two or more communication units, this analysis may indicate that a multiple birth has occurred, wherein, for example, a set of twin calves may be suckling from the mother. This feature of determining a multiple birth is common with sheep and other species. Thus, a relationship may also be determined between calves.

At step 610, the method includes recording any determined relationships between animals and optionally displaying any determined relationships.

Figure 6A:
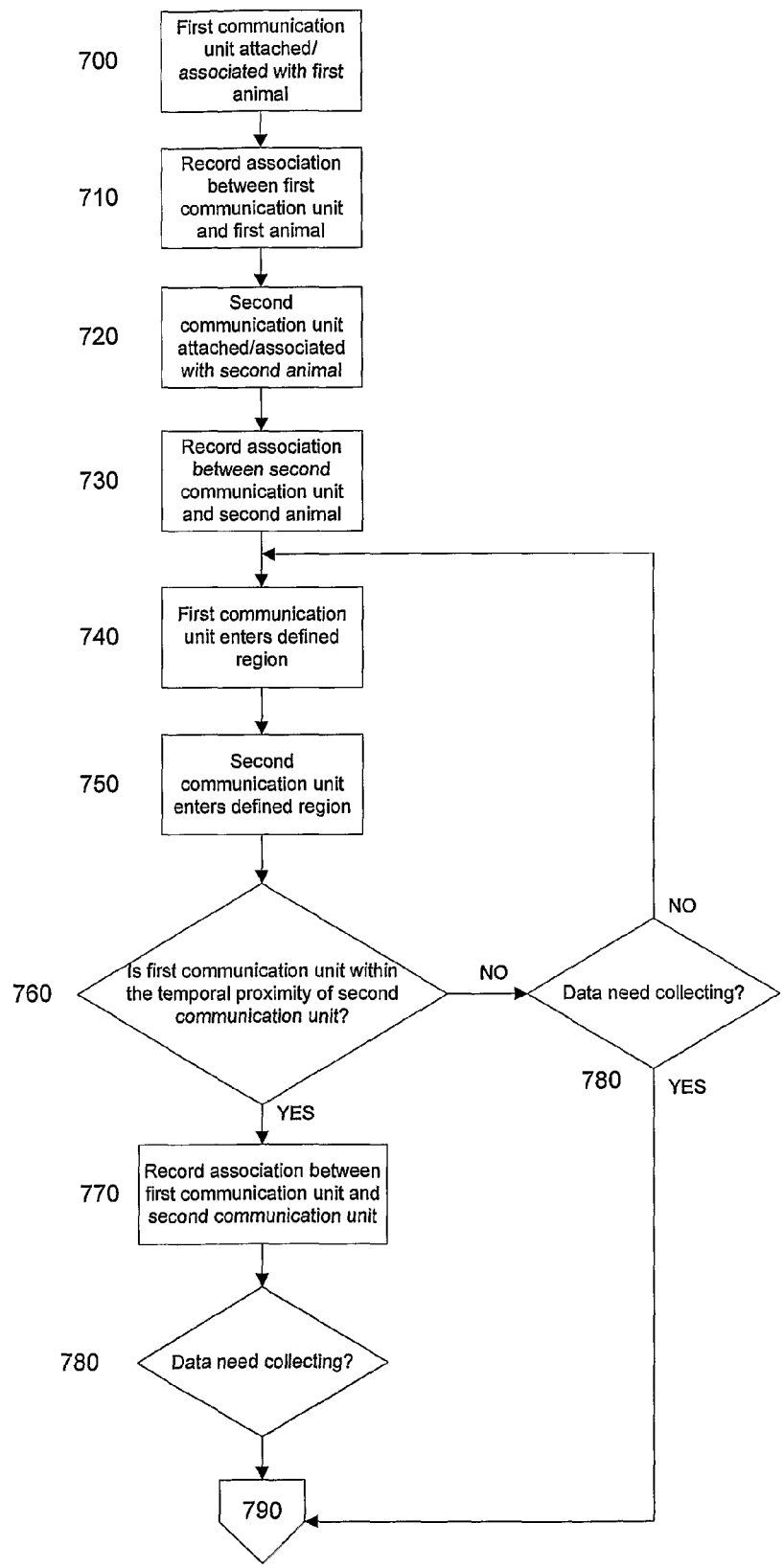
FIGS. 6A and 6B illustrate another example flow diagram of a method of determining a relationship between a first and second animal based on temporal proximity.
Figure 6B:
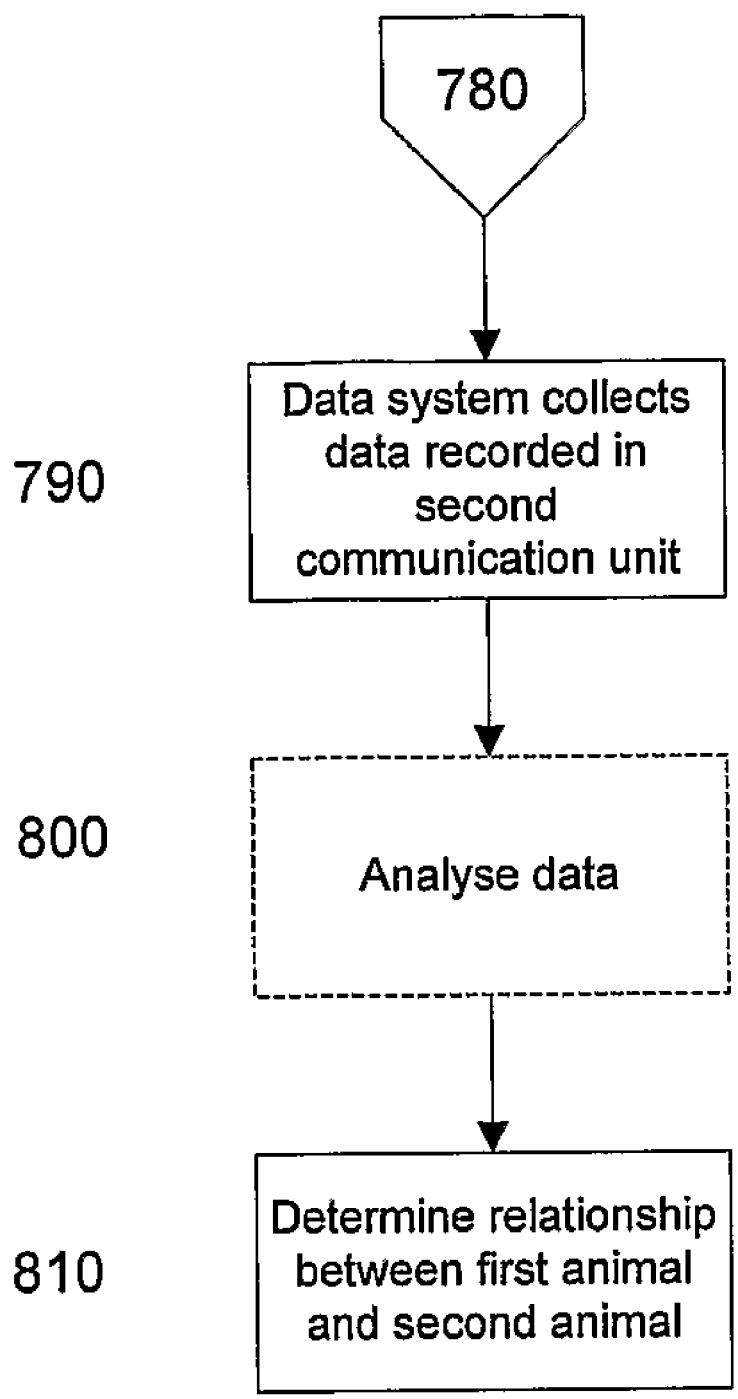
Figure 7A:
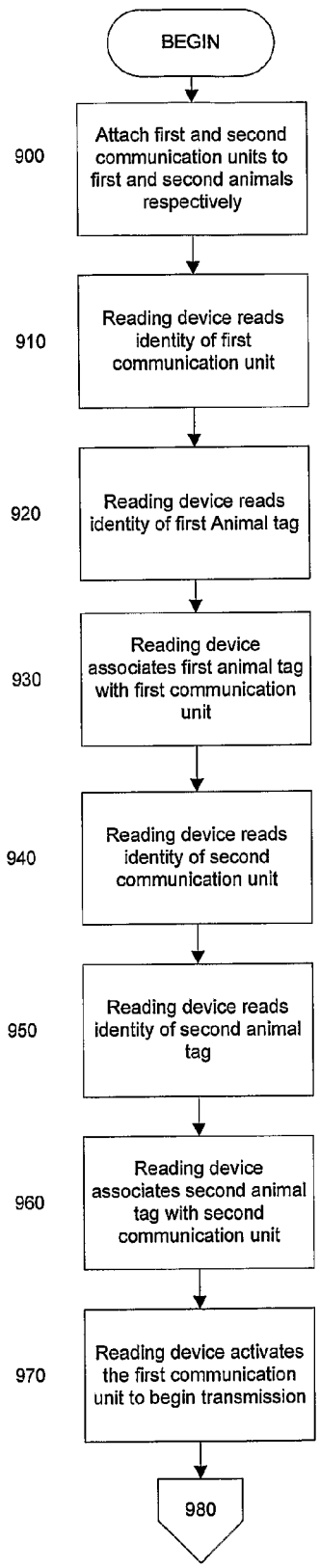
FIGS. 7A, 7B, 7C and 7D illustrate a more detailed example flow diagram of a method of determining a relationship between a first and second animal.
Figure 7B:
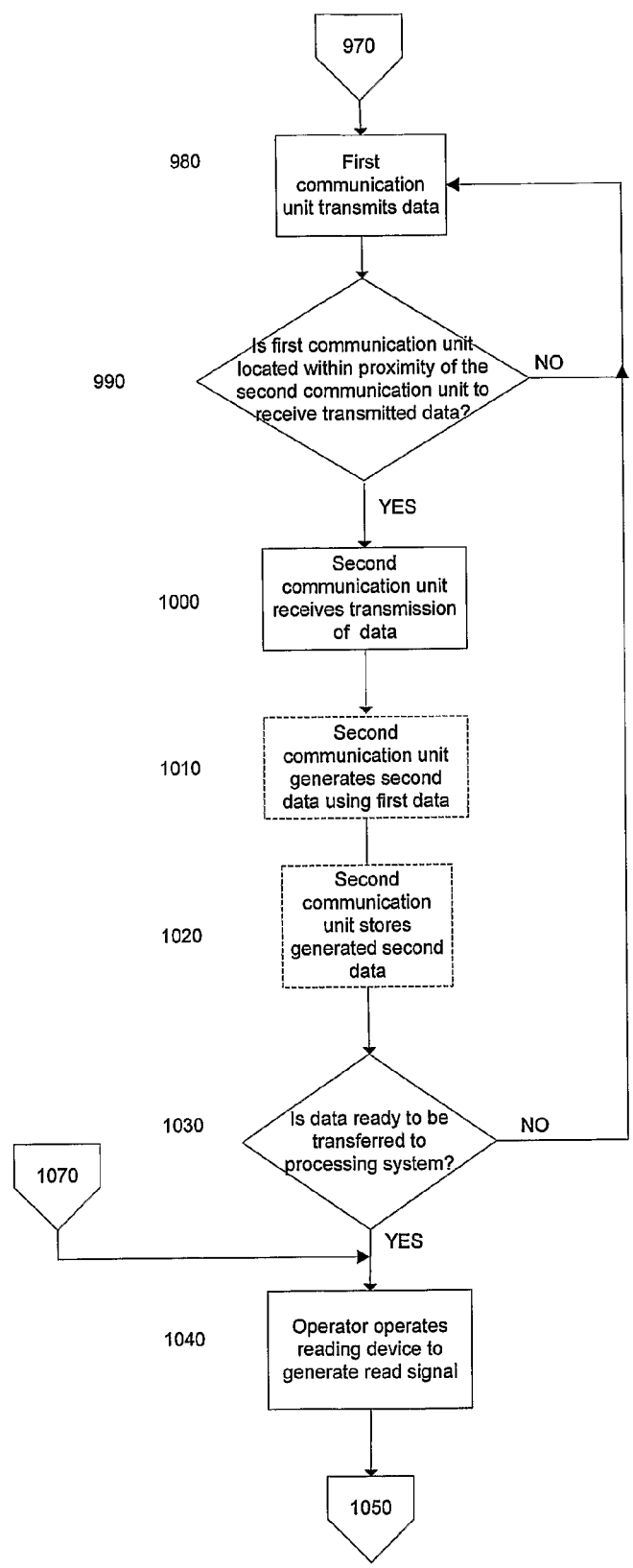
Figure 7C:
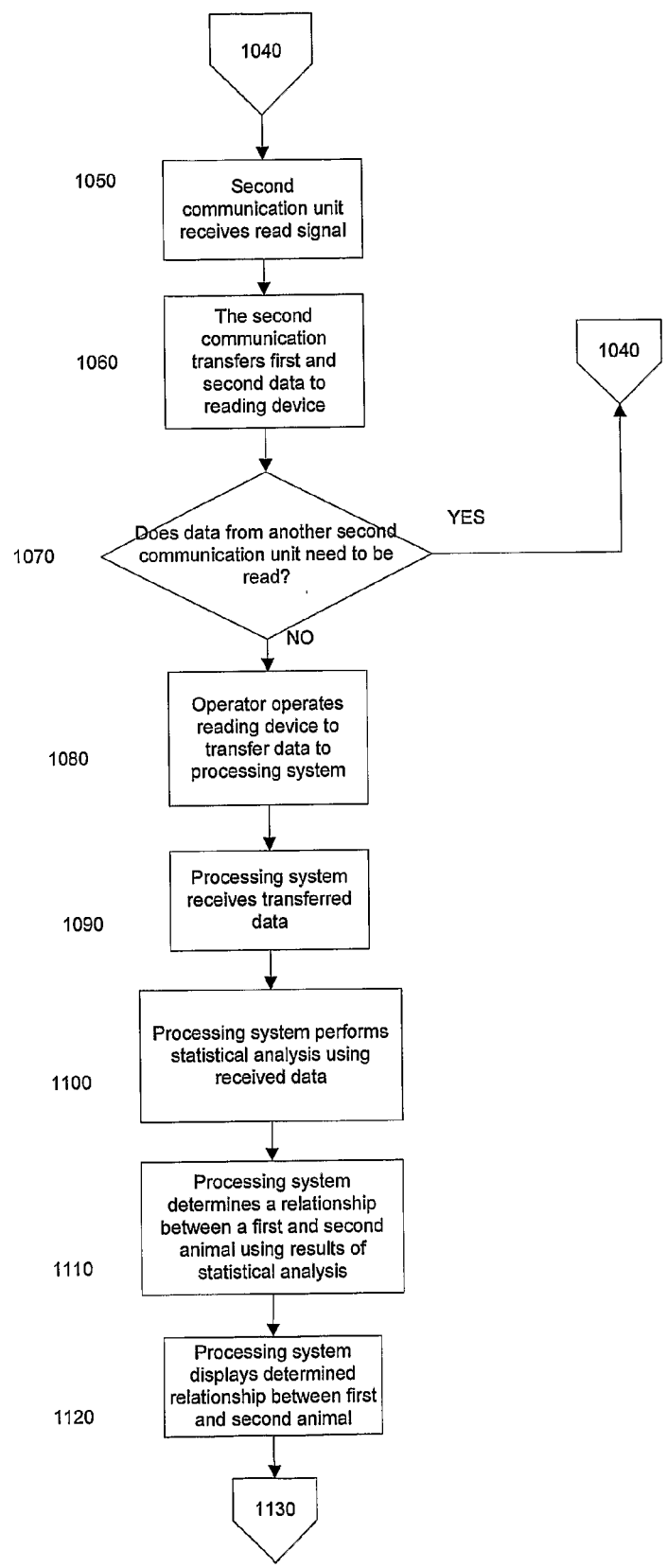
Figure 7D:
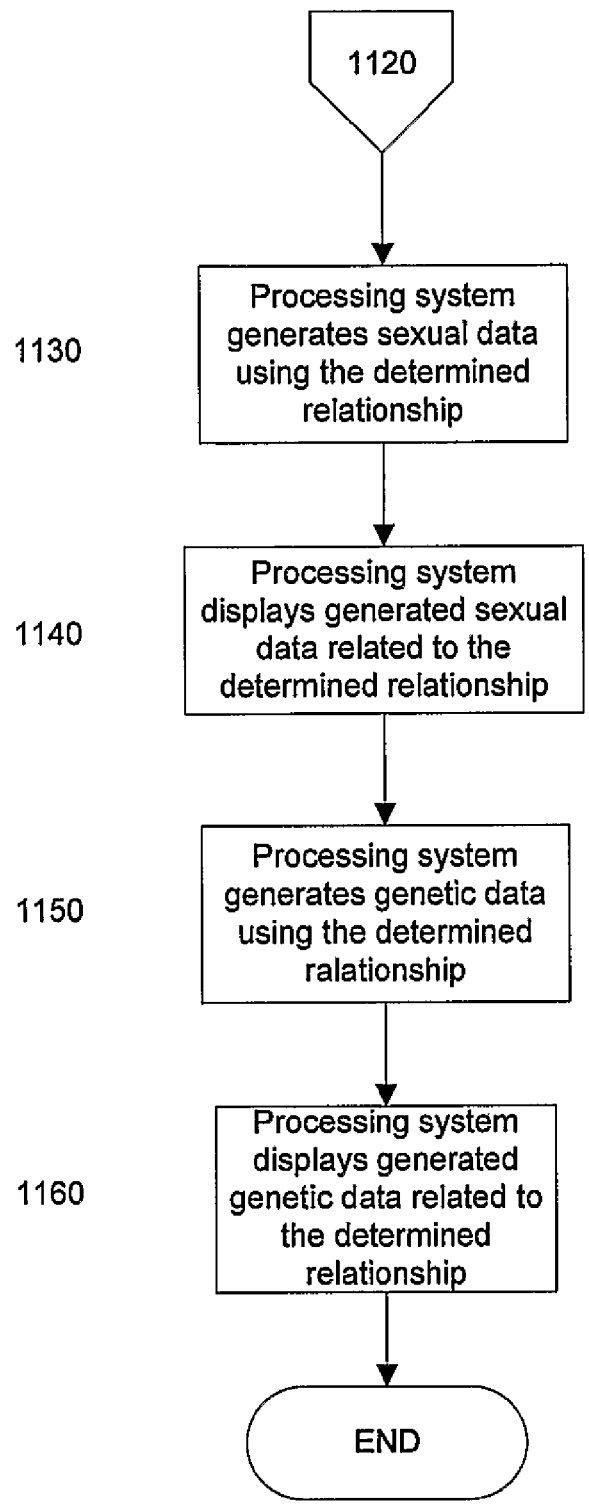

Another more detailed example of determining a relationship between a first animal and a second animal will now be described with reference to FIGS. 6A and 6B. The method described with reference to FIGS. 6A and 6B make reference to the example system described in FIG. 3B.

In particular, step 700 to 730 are performed similarly to steps 500 to 530 previously described.

At step 740, when the first communication unit 370 attached or associated with the first animal 100 enters the defined region 390 relative to the reading device 300, the first communication device 370 transmits a signal 375 including data which is at least indicative of the identity of the first communication unit 370 to the reading device 390. This may occur when the first animal 100 is visiting the water trough throughout the day.

At step 750, when the second communication unit 380 attached or associated with the second animal 110 enters the region 390 relative to the reading device 300, the second communication device 320 transmits a signal 385 including data which is at least indicative of the identity of the second communication unit 380 to the reading device 300. Again, this may occur when the first animal is visiting the water trough throughout the day.

At step 760 and 770, if the reading device 300 receives the signal 385 from the second communication unit 380 within a defined temporal proximity 120 (for example 5 seconds) of receiving the signal 375 from the first communication unit 370, then an association between the respective communication units 370, 380 is recorded by the reading device 300.

At step 780, the method includes checking if the data needs to be collected.

Steps 740 to 780 continue to be performed until the data is collected from the reading device 300 by the processing system at step 790.

At step 800, the data system 130 optionally performs an analysis on the recorded associations to determine any relationships between animals 100, 110. Similarly to the method described earlier, a table can be generated which is indicative of a frequency of recorded associations. Table 3 provides an example of recorded associations collected from the reading device.

| ASSOCIATION | FREQUENCY |
|---|---|
| 1000 AND 1003 | 547 |
| 1000 AND 1005 | 20 |
| 1000 AND 1007 | 2 |
| 1005 AND 1007 | 432 |

In regard to the animal associated with communication device having identity 1000, using a probabilistic analytical approach, it is apparent that the association between the communication units having identities 1000 and 1003 are significantly larger than the association between the communication units having identities 1005 and 1007. Thus, a relationship is determined to exist between the animal associated with the communication unit having identity 1000 and the animal associated with the communication unit having identity 1003.

Furthermore, in regard to the animals associated with the communication units having identities 1005 and 1007, it is also apparent that the number of recorded associations between these communication units is also significantly higher than any other recorded associations which these identities are included. Thus, a relationship is determined to exist between the animal associated with the communication unit having identity 1005 and the animal associated with the communication unit having identity 1007.

At step 810, the method includes recording any determined relationships between animals and optionally displaying any determined relationships.

Another example method of determining a relationship between a first animal and a second animal will now be described with reference to FIGS. 7A, 7B, 7C and 7D.

In particular, at step 900 the method includes attaching the first 310 and second communication units 320 to the first 100 and second animals 110 respectively. At step 910, the reading device 300 reads an identity of first communication unit 310. At step 920, the reading device 300 reads an identity of a first animal tag 395. At step 930, the reading device 300 associates the first animal tag 395 with the first communication unit 310.

At step 940 the reading device 300 reads the identity of the second communication unit 320. At step 950, the reading device 300 reads an identity of a second animal tag 395. At step 960 the reading device 300 associates the second animal tag 395 with the second communication unit 320. At step 970, the reading device 300 activates the first communication unit 310 to begin transmission.

At step 980, the first communication unit 310 transmits data. At step 990 and 1000, if the second communication unit 320 is within the proximity 120 of the first communication unit 310, the second communication unit 320 receives and stores the transmission of data (first data). At step 1010, the second communication unit 320 optionally generates second data using the first data. At step 1020 second communication unit 320 stores the second data. The second data could be indicative of a time which the first data was received, however other additional data is also discussed in this document. At step 1030, if the data is ready to be transferred to the processing system 140, control passes to step 1040 wherein an operator operates the reading device 300 to generate a read signal 340. If the data is not ready to be transferred, control passes back to step 980.

At step 1050, the second communication unit 320 receives the read signal 340 from the reading device 300. At step 1060, the second communication device 320 transfers 350 data to the reading device 300. At step 1060, if another second communication device 320 needs to be read, control flows back to step 1040. If another second communication unit 320 does not need to be read, the method continues to step 1080 where the operator operates the reading device 300 to transfer data to the processing system 140.

At step 1090, the processing system 140 receives the transferred data. At step 1100, the processing system 140 performs statistical analysis using the received data. At step 1110, the processing system 140 determines a relationship between the first and second animal 100, 110. At step 1120, the processing system 140 displays the determined relationship between the first 100 and second animal 110.

At step 1130, the processing system 140 generates sexual data using the determined relationship. At step 1140 the processing system 140 displays generated sexual data for the determined relationship. At step 1150, the processing system 140 generates genetic data using the determined relationship. At step 1160, the processing system 140 displays the generated genetic data to the determined relationship.

Variations

Spatial Proximity

The first and second communication units 310, 320 can be configured to be capable of communication over a limited spatial proximity 120, in order to determine whether the first animal 100 is positioned within the proximity of the second animal 110.

For example, if the first communication unit 310 attempts to transmit a signal 330 which the second communication unit 320 receives, the second communication unit 320 is determined to be within a defined spatial proximity 120 relative to the first communication unit 310. However, if the second communication unit 320 was positioned outside the defined spatial proximity 120, the second communication 320 unit may not receive the transmission from the first communication unit 310. This interaction of communication units 310, 320 allows for easy detection of a first animal 100 being within a defined spatial proximity 120 of a second animal 320.

The strength of the signal 300 may be selectively adjusted in order to adjust the defined spatial proximity 120. For example, the size of an antenna of a communication unit 310, 320 and/or power of the signal 330 may be adjusted to alter the defined spatial proximity 120. Thus, it will be appreciated that the range of the proximity 120 may be varied accordingly. However, other alternatives may also be appreciated by the skilled person for suitably adjusting the spatial proximity 120.

Generally, the spatial proximity 120 is configured to operate over a range of approximately one to two metres for determining a relationship between a first and second animal 100, 110, however, it will be appreciated that other proximity ranges may be achieved using different communication technology.

The spatial proximity 120 can be defined by the capabilities of a transmitting unit being able to transmit the signal 330, for example the power used to generate the transmission. Additionally, or alternatively, the spatial proximity 120 can be defined by the capabilities of a receiving unit being able to receive the signal, for example an antenna size used to receive the signal.

Optionally, the detection system may utilise magnetic fields and the 'Hall effect', to determine a spatial proximity 120 between two animals.

In an another form of the system 1, the detection system 130 may include a first communication unit 310 and a second communication unit 320 which both transmit signals indicative of the identity of the communication units 310, 320 and also receive and record signals representing data if they are within the defined proximity 120. In this form of the system 1, the communication units 310, 320 of the detection system 130 operate using half-duplex or fully duplex communication. The data recorded in both communication units 310, 320 can be collected by the data system and compared to each other to ensure accuracy. Thus, this configuration provides an additional advantage of error detection when results are correlated. In this configuration both the first communication unit 310 and the second communication unit 320 include a memory to store data.

Temporal Proximity

In relation to FIGS. 6A, 6B, 6C and 6D, the reading device 300 may record a time-stamp indicative of when the signals were received from communication units 370, 380 associated with the animals 100, 110. The recorded time stamps can then be used to determine a relationship between the animals 100, 110.

In operation, when data is received by the reading device 300 from one of the communication units 370, 380 associated with the animals 100, 110, the reading device 300 records a time stamp indicative of the time which the data was received by the reading device 300 or transferred by the communication unit 370, 380 associated with the animal 100, 110. The time stamp is associated with the identity of the communication unit which transmitted the signal.

The time stamps recorded with the data can be analysed in order to determine whether a relationship exists between the animals.

For example, Table 3 includes example data recorded by the third communication device.

TABLE 3

Example data from communications units with associated time stamps

| IDENTITY | TIMESTAMP |
|---|---|
| 1003 | 1/1/05 @ 09:00:23 |
| 1005 | 1/1/05 @ 09:00:25 |
| 1007 | 1/1/05 @ 09:01:25 |
| 1003 | 1/1/05 @ 09:02:00 |
| 1005 | 1/1/05 @ 09:02:01 |

Table 3 shows instances of multiple communication units being located within the defined region of the reading device. For example, the communication unit having identity 1003 was located within the defined region of the receiving unit at 9:00:23 am on the 1 Jan. 2005.

An analysis can be performed on the time stamps to determine whether animals were located within a temporal proximity of each other, and therefore determining whether a relationship exists between the respective animals. The reading device 300 can be configured to include a maximum proximity limit indicative of a number of seconds, or portions thereof. In this particular example, the maximum proximity limit is ten seconds.

Comparing the first record of communication device having identity 1003 to the second record of communication device having identity 1005, it is apparent that these communication units 1003, 1005 were located within the defined region 390 of the reading device 300 within 2 seconds of each other. Therefore, in this comparison, the difference between timestanips (2 seconds) is within the maximum proximity limit (10 seconds), so the animal associated with communication device having identity 1003 is considered related to the animal associated with communication device having identity 1005.

Comparing the first record of communication device having identity 1003 to the third record of communication device having identity 1007, it is apparent that the communication units 1003, 1008 were located within defined region 390 of the reading device 300 within 60 seconds of each other. Therefore, in this comparison, the difference between timestamps (60 seconds) is not within the maximum proximity limit (10 seconds), so the animal associated with communication device 1003 is considered unrelated to the animal associated with communication device 1007.

As can be seen from the data in Table 3, the time stamps indicating when the communication units and animals were located within a communication region of the fixed reading device 300 can be used to determine relationships between the animals.

It will be appreciated from previous examples, the frequency of particular animals being located within a relative proximity 120 of another animal can also be used in combination with the temporal aspect of the method and system 1 to more accurately determine whether particular animals are related.

It will be appreciated that the maximum proximity limit can be selectively configured, particularly depending on the type of animal being analysed. For example, a cow may travel at a speed of approximately 0.5 metres/second and as such the maximum proximity limit may be selected to be 10 seconds. However, in contrast a sheep may travel at a speed of approximately 1 metre/second and as such the maximum proximity limit may be selected to be 5 seconds to take into consideration the increased travelling speed of this type of animal. The reading device 300 or processing system 140 may be configured to provide a suggested maximum threshold time period in response to input from the user indicative of the type of animal which is being monitored.

In another variation, the detection system 130 may include a first communication unit and a second communication unit which receive and record data, and a fixed transmitting device for transmitting a signal. Similar to the fixed reading device 300 of the detection system 130 described earlier, the fixed transmitting device is located in a fixed location in the area within which the animals graze, such as a water trough. The respective communication units receive the transmitted signal from the transmitting device when the respective communication units are positioned within the defined communicating region of the transmitting device. In response to receiving the signal, the respective communication unit records a time indicative of the signal being received or being transferred from the transmitting device. The data recorded in each communication system can then be collected by the data system for analysis, wherein the recorded data is used to determine whether the first and second animals were detected within a temporal proximity of each other within the defined region of the transmitting device.

In another variation, the communication units may be replaced by machine readable coded data, such as a bar code, or the like. The coded data may be provided on or with the animals such that it can be sensed when the animal enters the defined region 390. In this particular case, the reading device 300 senses the coded data provided on each animal when the animal enters the defined region 390. The time between sensing the coded data provided with the first animal 100 and sensing the coded data provided with the second animal 110 is compared to a maximum temporal proximity, and if the difference is less than the maximum temporal proximity, an association is recorded between the first animal 100 and second animal 110.

Combinations of Spatial and Temporal Proximity

A further example of a system and method for determining a relationship between a first animal and a second animal will now be described.

The system may utilise GPS technology. In this form, the communication units may be provided with a GPS unit which transmits a time-stamped position of the animal. The reading device 300 or processing system 140 receive the time-stamped position of the communication units and using the above methods, relationships between the animals can be determined. It would be apparent that this form of system would utilise a combination of temporal and spatial proximity to determine the relationship between animals as the position of the animals is time-stamped.

In a further form, the system may utilise triangulation. In this form, the system would include three or more beacons placed around or within a paddock which the animals graze within. Each beacon acts as a transceiver which transmit a signal having a unique frequency to the communication units attached or associated with the animals within the paddock. The beacons may be powered by a power source used for the electric fence. The communication units in response to receiving the signals, transmit a signal indicative of the identity of the respective communication unit back to the beacons. A processing system may then analyse the signal strength of each signal received at each beacon to determine the position of each communication unit, and thus each animal, at a particular point in time within the paddock. In this particular case, the communication units may only need to be passive. However, active communication units can also be used.

It will be appreciated that the roles of the beacons and the communication units may be swapped, such that the beacons are passive receivers and the communication units are transmitters.

It will also be appreciated that a reduced number of beacons can be used if a directional antenna is provided with each communication unit.

Communication Units

The communication units 310, 320, 370, 380 may use varying versions of communication protocols or mediums such as the radio frequency spectrum, Bluetooth, Infra Red, passive or active RFID technology, ultrasonic frequency technology, SAW technology, acoustic technology, and other common wireless communication methods and protocols.

The first and second communication units 310, 320, 370, 380 may include a power source (ie active communication units, such as active RFID tags). The power source may be rechargeable. A recharging module may be provided which operably receives and recharges a plurality communication units, for example one hundred communications units, simultaneously. In an additional or alternate form, the first and second communication units 310, 320, 370, 380 may be provided with solar power generator to recharge the rechargeable power source. It is preferred that the recharging module recharges the communication units to operate for a breeding period of particular animals, for example six to eight weeks.

The communication units 310, 320, 370, 380 may optionally be passive devices, such as passive RFID units, and as such do not require a power source. The communication units 310, 320, 370, 380 may be responsive to a read signal 340 generated by the reading device 300 such as to transfer data back to the reading device. When the reading device 300 and RFID unit's modulators are positioned in close proximity of one another, an inductively coupled tuned circuit is formed. Accordingly, an alternating current is passed through the reading device's 300 transceiver causing a corresponding current to be induced in the RFID unit's antenna.

Subsequently, the RFID unit uses the received signal to transmit a transmission of data 390 generally indicative of an identity of the RFID unit back to the reading device's 300 transceiver. This process may include the RFID unit's modulator being used to modulate the received signal induced in the RFID unit's antenna. This in turn causes backscatter modulation of the signal, which can be detected by the reading device's 300 transceiver, allowing data to be recorded.

It will be appreciated that an active RFID tag may be used instead or in combination with a passive RFID tag.

It will be appreciated that a combination of passive and active RFID units may be used with the communication units 310, 320, 370, 380. As such, a first communication unit 310, 370 may include an active RFID unit, and a second communication 320, 380 unit may include a passive RFID unit. When the first and second communication units 310, 320, 370, 380 are positioned in close proximity of one another, an inductively coupled tuned circuit is formed similarly to the above variation.

As discussed previously, in particular embodiments, the first and second communication units 310, 320 may perform different functionality, such as in FIG. 3A, wherein the first communication unit 310 may be a transmitter and the second communication unit 320 may receive data transmissions from the first communication unit 310 and recorded data can be collected by the processing system 140 via a reading device 300. Thus, as the first 310 and second communication units 320 may include varying parts to perform varying functionality, the cost of manufacturing or providing the first and second communication units 310, 320 may also vary. Therefore, a distribution of the first communication units and second communication units 310, 320 amongst the first and second animals 100, 110 may reduce costs.

For example, a herd of cattle may include 4 sires and 100 dams. Therefore a less expensive communication unit could be attached to the dams and the more expensive communication unit may be attached to the sires, thus reducing the overall cost of implementing the system. It will be appreciated however that the distribution of the first and second communication units amongst the herd does not affect the overall functionality of determining the relationship between a first and second animal, but rather serves the purpose of reducing the financial costs involved in implementing the system.

Optionally, the first and/or second communication units 310, 320, 370, 380 may include a tilt sensor. In applications where a sexual relationship is required to be determined, the tilt sensor in the communication unit 310, 320, 370, 380 may provide additional information regarding when a sire mounted a dam to successfully conceive the offspring, and thus determining a date of birth for the respective offspring. The tilt sensor can be configured to record a time stamp of such an event occurring.

Optionally, the communication units 310, 320, 370, 380 may be configured to transmit during specific timeframes. During periods when animals tend to sleep, a significant number of transmissions may be recorded due to the animals herded together. As such, the communication units 310, 320, 370, 380 may be configured to stop transmitting data between certain timeframes such as to provide more accurate data for determining a relationship between animals.

The communication units 310, 320, 370, 380 may also be attached to or associated with the first animal 110 while the communication units are not transmitting. This option allows the elimination of unnecessary readings while animals are being handled in close proximity to each other. As such, after a period of time, the communication units 310, 320, 370, 380 may begin transmitting data. This may be initiated remotely, or the communication units 310, 320, 370, 380 may be pre-configured to begin transmitting data. Alternatively, the reading device 300 may be used to generate an activation signal which the communication unit's 310, 320, 370, 380 processor is responsive to cause the communication unit 310, 320, 370, 380 to begin transmitting data.

In another optional embodiment, the data transmitted by the communications units 310, 320, 370, 380 can be indicative of a direction or orientation of the communication unit 310, 320, 370, 380. The direction and/or orientation may be two or three dimensional. The direction of or orientation may be used with spatial and/or temporal proximity data to determine whether two animals were merely crossing paths and were therefore unrelated. Furthermore, the direction of travel can be used to determine social relationships between particular animals. For example, leader animals are generally located at a particular direction and/or orientation compared to other animals. By utilising the direction and/or orientation of the animal, a social relationship can also be determined between animals. The direction and/or orientation can also be used for determining a sexual relationship or genetic relationship between two animals. For example, the orientation of a first animal and second animal may be substantially aligned to indicate a sexual relationship between the animals.

A further optional embodiment includes the communication units 310, 320, 370, 380 utilising acoustic technology. The communication unit 310, 320, 370, 380 may be provided with a converter module which receives a wireless signal, such as a radio signal, from either another communication unit or a reading device 300 and converts the signal to an acoustic signal. The communication unit 310, 320, 370, 380 is provided with a set of wave reflectors which produce, in response to the acoustic signal, uniquely encoded acoustic wave pulses which are at least partially indicative of the unique identity of the communication unit. The converter module senses and converts these unique pulses into an encoded signal at least partially indicative of the identity of the communication unit 310, 320, 370, 380 which is then transferred back to the source of the signal.

In another optional embodiment, the communication units 310, 320, 370, 380 may be selectively configured to only operate for a period of time. This ensures that if the communication unit is stolen, the communication unit 310, 320, 370, 380 is useless once the period of time has lapsed.

The communication units 310, 320, 370, 380 and reading/transmitting devices preferably conform to international electro-magnetic radiations standards. The communication units, and reading/transmitting devices are preferably packaged to conform to accredited IP67 standard. Furthermore, the communication units are preferably IP67 drop and weather resistant compliant.

The communication units 310, 320, 370, 380 can optionally be provided with UV resistant housing.

The communication units 310, 320, 370, 380 may be provided with an internal clock to store a time such as a time stamp.

The communication units 310, 320, 370, 380 may optionally be provided with encryption modules and or decryption modules to encrypt and/or decrypt data transferred and/or received.

In another variation, the communication units 310, 320, 370, 380 may utilise triangulation processes wherein signal strength is measured by nearby communication units to determine a relative position. For example, a first communication unit transmits a signal. Communication units within range receive and measure the strength of the received signal. The strength measurement by a number of communication units can then be used to determine a relative position of the transmitting communication unit. As can be seen the signal strength can be used to determine a relative position of a communication unit to one or more other communication units. The relative position can be additional data which can be used to determine whether a relationship exists between particular animals.

One or more of the communication units can be configured to periodically transmit a signal. Alternatively, the reading device may be configured to periodically transmit a signal. The period between transmissions may be selectively configured.

The communication units can include volatile (Random Access Memory) and non-volatile memory (ROM, EEPROM). The communication units may also include removable memory modules such as to alter size of the memory of the communication units.

In another optional embodiment, one or more communication units may be integral with the processing system. In this embodiment, the data stored received in communication unit may be analysed by the communication unit, thus avoiding the transferal of the data to an external or remote processing system.

Reading Device

The reading device 300 may be a hand-held device, or alternatively, the reading device 300 may be a fixed device. The reading device 300 may be utilised as part of the detection system 130 (as apparent in temporal proximity embodiments). Alternatively, the reading device 300 may be utilised as part of the data system 150 for collection data (as apparent in the spatial proximity embodiments). The reading device 300 can utilise a wireless communication medium in order to receive data from the communication units, and/or transmit data to the communication units.

The reading device 300 may include a transceiver for generating and transferring a read signal 340 to the communication units, and for receiving transferred data 350 from the communication units. The reading device 300 also includes a memory store for storing the received data, and a processor to control the transceiver and memory store. Additionally, the processor may be configured to encode the received data using an encryption algorithm, such that the data may only be analysed by specific software programs which include a complementary decryption system.

Optionally, the reading device 300 may include a modulator if the passive communication units are used.

The reading device 300 is generally configured to transfer the received data from the communication units to a processing system 140 for analysis such that a relationship may be determined. The reading device 300 may transfer the data 360 using a wireless communication medium as earlier discussed, however this is not essential, and as such a physical medium such as a RS232/485 communication medium between the reading device 300 and the processing system 140 may be utilised. It will be appreciated that other forms of physical medium transfer may also be used. Optionally, the reading device 300 may include a removable storage medium (such as a USB key or smart card) that may be adapted to be read by the processing system 140.

The reading device 300 can be provided with an output device, for example a display, such that recorded data can be displayed and viewed. The reading device 300 may also provided with an input device, for example a keyboard.

The reading device 300 is generally provided with a long life battery supply, such as a Lithium Ion Long Life rechargeable battery. As such, the reading device may be rechargeable. A cooperating recharging cradle can be provided which is operably receivable with the reading device to recharge the power source of the reading device.

The memory of the reading device 300 generally includes volatile and/or non-volatile memory. Furthermore, portions of the memory can be removable and/or non-removable to adjust the size of the memory of the reading device.

Processing System

The processing system 140 of the data system 150 may optionally be provided as a remote processing system, wherein a network address, such as a Internet web-site, is used to transfer the data to the processing system for analysis. When the analysis has been performed, a notification is provided to the source of the received data (such as a farming entity) indicating that the results of the analysis are ready for collection. The collection of results of the analysis can be performed electronically. The processing system 140 may be configured to generate an invoice for performing the analysis, wherein the invoice is provided to the farming entity which is using the communication units. The results of the analysis can be collected by the farming entity after a payment of the invoice.

When the processing system 140 decrypts the encoded data received from the reading device 300, the data is analysed and the results of the analysis can be provided in file formats of common on-farm information packages such as Woolpak, Stockbook, BreedObject, PAM and industry information supplier systems such as Breedplan and SGA, and other standard file formats such as Microsoft Excel or Access.

Optionally, the processing system 140 may be configured to transfer data to the reading device 300. This may be appropriate if a farming entity wishes to have access to information from the processing system whilst on the farm.

Optionally, additional data may be used by the processing system 140 to assist in determining whether a sexual relationship exists between particular animals. For example, if data received from the a communication unit 310, 320, 370, 380 indicates a measured tilt beyond an angular threshold at a particular time when another communication unit was located within the defined proximity 120, this additional data can provide a further indication that the determined cow and bull were involved in sexual intercourse, and therefore a sexual relationship exists between the particular animals which may result in an offspring. It is perceived that the additional data could be used to determine other relationships such as social relationships between particular animals.

If a sexual relationship is determined, the method and system may include generating sexual data using the determined sexual relationship. This may include using received data from one or more communication units and/or past received data and results to determine at least one of:

whether the sire is performing at optimum;
which sire was successful in mating
whether the dam is conceiving easily;
the date of conceiving;
how many offspring has the dam conceived;
the success rate of the dam successfully giving birth to the offspring.

Additionally or alternatively, if a genetic relationship has been determined, the data system may generate genetic data for the determined genetic relationship. This may include using received data from one or more communication units or past received data and results to determine at least one of:

the date of birth of the offspring;
the dam of the offspring;
the sire of the offspring;
the birth type (ie. single offspring, twins, triplets etc.)
how many offspring does the dam mother at the moment.

It will be appreciated that particular datum of the genetic or sexual data may be determined at different stages or time periods. For example, a particular dam and offspring may have been determined to have a genetic relationship at a first period of time, and the same dam and a sire may have been determined to have a sexual relationship at a separate second time period. Thus, when the data for these two determined relationships are correlated, a genetic relationship between the sire and the offspring may be determined.

The data system 150 may additionally be used to record additional information associated with the generated genetic data. This may include at least one of:

measurement of the individual trait(s) of the offspring;
comparable measurements of siblings and half-siblings if such exist; and
measurement of individual traits of sires and dams The data system 150 may use the genetic data and the additional information to generate an Estimated Breeding Value (EBV) for the respective offspring and parents. The EVB can then be used to assess how valuable a particular offspring or sire or dam is, such as a monetary value. Alternatively, the data system may transfer the genetic data/sexual data and additional information to a Estimated Breeding Value service provider to determine the Estimated Breeding Value of the animals.

Optionally, the processing system 140 can generate, using the received data, breeding data related to the dam, wherein the breeding data related to the dam is indicative of at least one of the fertility and/or fecundity of the dam; the fertility and/or fecundity of the sire; a number of offspring the dam has given birth to; and whether the dam can successfully raise multiple offspring;

Optionally, the processing system 140 can generate, using the received data, breeding data related to the sire, wherein the breeding data related to the sire is indicative of: the fertility/fecundity of the sire; timing of mating; expected date of birth correct dam mated by sire; various Estimated Breeding Values for dams and sires.

Optionally, the genetic and sexual data may be displayed on other processing systems 140 used by other users in order to assess the value of the respective animal.

Other Variations

Figure 3C:
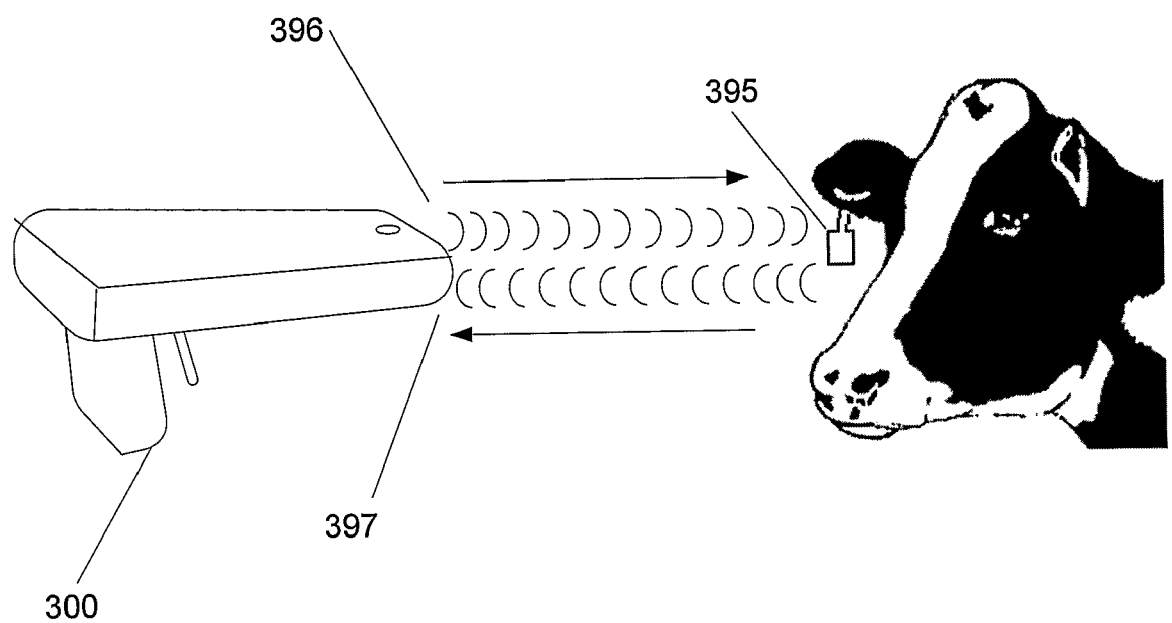
FIG. 3C illustrates an example of using the reading device to record an identity of an animal tag attached to an animal.

In order to easily associate a transmitter identity or a transceiver identity with a particular animal, the animal may additionally include an animal tag 395 including a unique identity, as shown by example in FIG. 3C. In this example, an animal, in this case a cow, includes an animal tag 395 which for example is attached to the ear of the animal. The tag 395 includes a unique identity to identify the respective animal. The reading device 300 may be used to record the unique identity of the tag 395 and associate the tag identity with the identity of the communication unit associated with the animal. In one embodiment, the reading device 300 may generate a read signal 396 which the tag is responsive to in order to transfer 397 the tag identity back to the reading device 300. An active or passive animal tag may be used to identify the animal In an optional embodiment, the communication unit 310, 320, 370, 380 and animal tag 380 may form a single integral device.

In another optional embodiment, direct communication between the communication units 310, 320, 370, 380 and the processing system 140 may be accomplished, thus removing the requirement of a reading device 300. However, for ease of use in the livestock industry, a reading device 300 can be provided to allow easy collection of data from a number of animals.

As previously discussed, each communication unit 310, 320, 370, 380 may be attached to or associated with each animal. This attachment may be performed by coupling the communication unit with a harness 365 which is placed around the neck or appendage of a respective animal. The harness 365 may be expandable (for example elasticised) such that as a particular animal grows, the harness 365 may be adjusted or adjust automatically to compensate for the increase in size of the animal. Additionally, the harness 365 is removable if the harness 365 becomes caught on a fence or the like. Different sized harnesses 365 may also be provided for different types of animals, or different developmental stages of animals.

In one form, the harness 365 may operate using a hook and loop coupling means allowing for secure attachment to the animal. Additionally, the hook and loop coupling means allows the communication unit 310, 320, 370, 380 and harness 365 to be pulled off by the animal if it becomes snagged, therefore reducing the likelihood of choking the animal. The communication units 310, 320, 370, 380 are generally provided with a brightly coloured or fluorescent casing such that a farmer or the like can easily find a detached harness 365 and communication unit 310, 320, 370, 380 in the paddock.

In an alternative form, each communication unit 310, 320, 370, 380 may be attached to the animal in the form of a tag. For example, the tag may be coupled to a hole in the ear of the animal if this appropriate.

It will be appreciated that the communication unit 310, 320, 370, 380 may be associated with the animal using implanting techniques, wherein the communication unit is implanted into the animal and resides in the animal for a period of time. If appropriate, the communication unit may be swallowed by the animal, and thus associated therewith.

In another optional embodiment, a supplier entity may provide a plurality of communication units 310, 320, 370, 380, reading devices 300, harnesses 365, and/or chargers to a farming entity or the like. The supplier entity configures the communication units 310, 320, 370, 380 to be associated with the farming entity (such as a farming identity). This may be performed using the reading device 300. The reading device 300 can also be configured to be associated with the farming entity.

It will be appreciated that the above described method and system 1 may be used for determining relationships between cattle, sheep, goats, pigs, deer, native animals, wild animals, fish, birds, alpacas and any other species of livestock, grazing animals, and domesticated animals.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. Although a preferred embodiment has been described in detail, it should be understood that various changes, substitutions, and alterations can be made by one of ordinary skill in the art without departing from the scope of the present invention.

The invention claimed is:

1. A method of determining one or more relationships between animals from a group of animals, each animal in the group having a communication device to identify the respective animal, wherein the method includes:
   generating event data indicative of a plurality of detected events that animals are within a defined proximity of each other over a period of time, wherein each detected event indicates that the communication devices of respective animals were within the defined proximity; and
   analysing, using the event data, a frequency of the detected events for said animals to thereby determine if a relationship exists between said animals, wherein analyzing the frequency of events for the plurality of animal combinations includes comparing a distribution of the frequency of events between combinations of animals, wherein a relatively greater frequency of events for a particular animal combination compared to another animal combination indicates the relationship for the particular animal combination.

2. The method according to claim 1, wherein the defined proximity includes at least one of:
   a spatial proximity at a point in time; and,
   a temporal proximity at a location.

3. The method according to claim 1, wherein the method includes determining a genetic relationship between the animals.

4. The method according to claim 1, wherein the method includes determining at least one of:
   a sexual relationship between the animals; and
   a social relationship between the animals.

5. The method according to claim 1, wherein the method includes analysing the event data which is indicative of communication between the communication units that were within the defined proximity.

6. The method according to claim 1, each communication unit includes a communication unit identity and each animal has an animal identity, the event data being indicative the communication unit identity of each communication unit which was within the defined proximity, wherein the method includes:
   recording association data indicative of an association between the animal identity and the communication identity of each animal in the group;
   determining, using the event data and the association data, the identities of the detected animals; and
   displaying the identities of the animals of the relationship.

7. The method according to claim 1, wherein the method includes:
   recording the event data being indicative of a tilt of one of the communication units; and
   using the event data indicative of the tilt to determine a sexual relationship for the animals.

8. The method according to claim 1, wherein the method includes configuring the communication units to communicate during a selected period of time such that events are detected during the selected period of time.

9. The method according to claim 1, wherein the method includes:
   determining if two animal combinations which share a common animal between the two animal combination have a relatively greater distribution of events than other animal combinations, wherein the two animal combinations have a substantially equal distribution of events; and identifying that the animals of the two animal combinations are related.

10. The method according to claim 1, wherein the method includes:
   identifying a sexual relationship between a male animal and a female animal;
   identifying a genetic relationship between the female animal and an offspring; and
   determining, based on the sexual relationship and the genetic relationship, that the offspring is genetically related to the male animal.

11. The method according to claim 10, wherein the method includes determining, based upon the identified relationships and using the event data, at least one of:
   a date of birth of the offspring; and
   a date of conceiving.

12. A system for determining one or more relationships between animals from a group of animals, wherein the system includes:
   a detection system for generating event data indicative of a plurality of detected events that animals are within a defined proximity of each other over a period of time, the detection system including a plurality of communication units, each communication unit being associated with one of the animals in the group, wherein each detected event indicates that communication devices of respective animals were within the defined proximity; and
   an analysis means for analysing, using the event data, a frequency of the detected events for said animals to thereby determine if a relationship exists for said animals, wherein the analysis means is configured to compare a distribution of the frequency of events between combinations of animals, wherein a relatively greater frequency of events for a particular animal combination compared to another animal combination indicates the relationship for the particular animal combination.

13. The system according to claim 12, wherein the proximity includes at least one of:
   a spatial proximity at a point in time; and,
   a temporal proximity at a location.

14. The system according to claim 13, wherein each communication unit is at least one of:
   a transmitter unit;
   a receiver unit; and
   a transceiver unit.

15. The system according to claim 12, wherein the analysis means includes a processing system to analyse the event data.

16. The system according to claim 12, wherein the analysis means is configured to determine a genetic relationship between said animals.

17. The system according to claim 12, wherein the analysis means is configured to determine at least one of:
   a sexual relationship between said animals; and
   a social relationship between said animals.

18. The system according to claim 12, wherein each communication unit includes a communication unit identity and each animal has an animal identity, the event data being indicative the communication unit identity of each communication unit which was within the defined proximity, wherein the system includes:
   a record of association data indicative of an association between the animal identity and the communication identity of each animal in the group;
   the analysis means configured to determine, using the event data and the record of association data, the identities of the detected animals; and
   a display means to display the identities of the animals of the relationship.

19. The system according to claim 12, wherein the system includes:
   at least one of the communication units including a tilt sensor, wherein the event data is indicative of a tilting event.

20. The system according to claim 19, wherein the analysis means is configured to use the event data indicative of the tilting event to determine a sexual relationship for said animals.

21. The system according to claim 12, wherein the communication units communicate using a wireless communication medium.

22. The system according to claim 12, wherein the system includes a recording system to record event data for analysis by the analysis means, wherein the recording system is one of:
   portable; and
   located at a fixed position.

23. The system according to claim 12, wherein the recording system is configured to communicate with at least some of the communication units to record the event data.

24. The system according to claim 12, wherein detection system is configured to generate the event data being indicative of a direction and/or orientation of the animals within the defined proximity, wherein the analysis means is configured for determining, using the event data indicative of the direction and/or orientation, at least one of:
   a social relationship between the animals;
   a sexual relationship between the animals; and
   a genetic relationship between the animals.

25. The system according to claim 12, wherein at least one of the communication units is configured to operate after a first selected period of time or in response to an activation signal.

26. The system according to claim 12, wherein at least one of the communication units is configured to operate during a second selected period of time.

27. The system according to claim 12, wherein the analysis means is configured to:
   determine if two animal combinations which share a common animal between the two animal combination have a relatively greater distribution of events than other animal combinations, wherein the two animal combinations have a substantially equal distribution of events; and
   identify that the animals of the two animal combinations are related.

28. The system according to claim 12, wherein the analyzing means is configured to:
   identify a sexual relationship between a male animal and a female animal;
   identify a genetic relationship between the female animal and an offspring; and
   determine, based on the sexual relationship and the genetic relationship, that the offspring is genetically related to the male animal.

29. The system according to claim 28, wherein the analyzing means is configured to determine, based upon the identified relationships and using the event data, at least one of:
   a date of birth of the offspring; and
   a date of conceiving.

* * * * *